US008724600B2

(12) United States Patent
Ramsay et al.

(10) Patent No.: US 8,724,600 B2
(45) Date of Patent: May 13, 2014

(54) SYSTEMS AND METHODS FOR PROVIDING A MEDIA PLAYBACK IN A NETWORKED ENVIRONMENT

(75) Inventors: Max Gordon Ramsay, New South Wales (AU); David Boyd, New South Wales (AU)

(73) Assignee: Tymphany Hong Kong Limited, Sausalito, CA (US)

( * ) Notice: Subject to any disclaimer, the term of this patent is extended or adjusted under 35 U.S.C. 154(b) by 241 days.

(21) Appl. No.: 12/811,282

(22) PCT Filed: Jan. 7, 2009

(86) PCT No.: PCT/AU2009/000020
§ 371 (c)(1),
(2), (4) Date: Jun. 30, 2010

(87) PCT Pub. No.: WO2009/086602
PCT Pub. Date: Jul. 16, 2009

(65) Prior Publication Data
US 2010/0284389 A1 Nov. 11, 2010

(30) Foreign Application Priority Data
Jan. 7, 2008 (AU) .................................. 2008900065

(51) Int. Cl.
*H04W 4/00* (2009.01)
(52) U.S. Cl.
USPC .......................................... 370/338; 370/236
(58) Field of Classification Search
None
See application file for complete search history.

(56) References Cited

U.S. PATENT DOCUMENTS

| 7,451,177 | B1* | 11/2008 | Johnson et al. ............... 709/203 |
|---|---|---|---|
| 7,882,034 | B2* | 2/2011 | Hug et al. .......................... 705/52 |
| 7,899,908 | B2* | 3/2011 | Tanaka et al. ................. 709/226 |
| 7,937,554 | B2* | 5/2011 | Elzur ............................ 711/203 |
| 8,090,768 | B2* | 1/2012 | Johnson et al. ............... 709/203 |
| 8,254,352 | B2* | 8/2012 | Negron et al. ................ 370/338 |
| 8,385,304 | B2* | 2/2013 | Negron et al. ................ 370/338 |
| 2002/0093948 | A1* | 7/2002 | Dertz et al. ................... 370/355 |
| 2002/0163534 | A1* | 11/2002 | Choi et al. .................... 345/734 |
| 2004/0254995 | A1* | 12/2004 | Oka et al. ...................... 709/206 |
| 2005/0114896 | A1* | 5/2005 | Hug et al. ........................ 725/88 |
| 2006/0112171 | A1 | 5/2006 | Rader |
| 2006/0235883 | A1* | 10/2006 | Krebs ........................ 707/104.1 |
| 2007/0044010 | A1* | 2/2007 | Sull et al. .................... 715/500.1 |

(Continued)

FOREIGN PATENT DOCUMENTS

EP 1562328 B1 11/2007

OTHER PUBLICATIONS

WOX, International Search Report—2 pgs., Mar. 6, 2009, Avega Systems PTY LTD.

*Primary Examiner* — John Blanton
*Assistant Examiner* — Jay P Patel
(74) *Attorney, Agent, or Firm* — Tarolli, Sundheim, Covell & Tummino LLP

(57) ABSTRACT

Described herein are systems and methods for providing media playback in a networked environment. In one embodiment, a networked media playback device is configured to provide a web server for delivering data indicative of a browser-renderable control interface for the networked media playback device, or for a related networked media playback system. In overview, the user of a networked device, such as a wireless web enabled device, is able to render the control interface in a web browser, and in this manner control playback of digital media via the networked media playback device or networked media playback system.

11 Claims, 21 Drawing Sheets

(56) References Cited

U.S. PATENT DOCUMENTS

| | | |
|---|---|---|
| 2007/0049256 A1* | 3/2007 | Wassingbo ................ 455/414.1 |
| 2007/0101162 A1* | 5/2007 | Ando et al. .................... 713/193 |
| 2007/0136488 A1* | 6/2007 | Cho et al. ...................... 709/231 |
| 2007/0220561 A1* | 9/2007 | Girardeau et al. ............... 725/80 |
| 2007/0276925 A1* | 11/2007 | La Joie et al. ................. 709/219 |
| 2008/0002950 A1* | 1/2008 | Ando et al. .................... 386/109 |
| 2008/0010648 A1* | 1/2008 | Ando et al. .................... 719/328 |
| 2008/0015718 A1* | 1/2008 | Yoneda et al. ................... 700/94 |
| 2008/0084823 A1* | 4/2008 | Akasaka et al. ............... 370/235 |
| 2008/0168055 A1* | 7/2008 | Rinearson et al. ................. 707/5 |
| 2008/0208949 A1* | 8/2008 | Tanaka et al. .................. 709/201 |
| 2009/0003240 A1* | 1/2009 | Negron et al. ................. 370/254 |
| 2009/0030978 A1* | 1/2009 | Johnson et al. ............... 709/203 |
| 2009/0089842 A1* | 4/2009 | Perry et al. ...................... 725/78 |
| 2009/0094348 A1* | 4/2009 | Miura et al. ................... 709/219 |
| 2009/0241148 A1* | 9/2009 | Lo .................................. 725/81 |
| 2009/0298514 A1* | 12/2009 | Ullah ......................... 455/456.5 |
| 2010/0031366 A1* | 2/2010 | Knight et al. ................... 726/26 |
| 2010/0057886 A1* | 3/2010 | Dodge ........................... 709/219 |
| 2011/0153429 A1* | 6/2011 | Ullah ......................... 705/14.64 |
| 2012/0188911 A1* | 7/2012 | Negron et al. ................. 370/254 |

* cited by examiner

SYSTEMS AND METHODS FOR PROVIDING A MEDIA PLAYBACK IN A NETWORKED ENVIRONMENT

FIELD OF THE INVENTION

The present invention relates to systems and methods for providing media playback in a networked environment. Embodiments of the invention have been particularly developed to allow a wireless web enabled portable device (such as an MP3 player, cellular telephone, or the like) to interface with one or more networked media playback devices without the need to install special software on the portable device. While some embodiments will be described herein with particular reference to that application, it will be appreciated that the invention is not limited to such a field of use, and is applicable in broader contexts.

BACKGROUND

A networked media playback device (such as a networked speaker device) typically includes a central processing unit coupled to a memory unit, a networking interface and output hardware (such as an amplifier and one or more speaker cones in the case of a speaker). The central processing unit provides a media rendering functionality whereby data indicative of audio received via the networking interface is processed to provide a corresponding audible output via the audio output hardware. In the case of a wireless media playback device, the networking interface typically implements a wireless networking standard such as the IEEE 802.11 standard.

Control of a networked media playback device is typically achieved by way of either a purpose-built control device, or by way of another computational platform that runs a software application for allowing control functionality. For example, a common approach is to provide a software-based media player application on a networked PC.

Digital media files might reside at various locations on a network. These locations might include various PCs, networked storage devices, and networked personal media playback devices. The Universal Plug and Play Audio and Video (UPnP AV) standard, supervised by the Digital Living Network Alliance (DLNA), provides a useful framework for allowing playback of digital media files residing at such locations. In particular, the UPnP AV standard regards such locations as "media servers", and provides a framework whereby a "media renderer" (a playback device) obtains media for playback from those locations. Under such a framework, it is necessary to have three components: a media server for maintaining the media, a media renderer for playing back the media, and a control device for providing instructions.

It is known to install software on portable devices to allow those devices to take on roles within a UPnP AV arrangement, for example as control devices. However, it is not always possible, practical, and/or preferable to install such software on those devices.

SUMMARY

Described herein are devices, systems and methods for providing media playback in a wireless speaker devices and/or wireless audio systems. However, although wireless speaker devices and wireless audio systems are considered as a primary example, various embodiments are equally applicable to other audio systems, particularly other networked audio systems, and networked digital media playback systems generally.

One embodiment provides a method, in a networked media playback device, for allowing a wireless web enabled device to provide media playback control signals for the networked media playback device or a networked media playback system, the method including the steps of
  (i) providing a local web server for delivering data indicative of a browser-renderable control interface for the networked media playback device or networked media playback system;
  (ii) being responsive to a predetermined request from a wireless web enabled device for delivering data indicative of the control interface for rendering in a web browser of the wireless web enabled device;
  (iii) being responsive to utilization of the control interface as rendered in the web browser application for defining one or more playback control commands; and
  (iv) implementing the one or more playback control commands in the networked media playback device or networked media playback system.

One embodiment provides a method wherein step (ii) includes:
  (iia) receiving data indicative of a browser navigation request from the wireless web enabled device, the browser navigation request being indicative of a predetermined URI;
  (iib) being responsive to the browser navigation for resolving the URI to the local web server such that the data indicative of the control interface is delivered in response to the browser navigation request.

One embodiment provides a method wherein the networked media playback device provides a local domain name server for allowing resolution of the predetermined URI.

One embodiment provides a method wherein the networked media playback device or networked media playback system is controllable in accordance with the UPnP protocol.

One embodiment provides a method wherein the wireless web enabled device includes a memory unit that maintains one or more media files, and the one or more playback commands includes an instruction to render a selected one or more of the media files via the networked media playback device or networked media playback system.

One embodiment provides a method including the steps of:
  connecting to a wireless network;
  identifying one or more other networked media playback devices on the network;
  determining whether or not to provide the local web server based on analysis of the one or more other networked media playback devices on the network, such that only a single control interface is provided on the network.

One embodiment provides a method wherein the control interface is for a networked media playback system having a master networked media playback device, and the step of implementing the one or more playback control commands includes providing the one or more playback control commands to the master networked media playback device.

One embodiment provides a computer program product for performing a method as described herein.

One embodiment provides a one or more processors cause the one or more processors to carry out a method as described herein.

One embodiment provides a computer system including one or more processors configured to carry out a method as described herein.

One embodiment provides a media playback unit including:
  a networking interface for connecting to a computer network;

a memory module for maintaining data indicative of a browser renderable playback control interface;

a processor for providing a web server for delivering the data indicative of the browser renderable playback control interface to a wireless web enabled device, thereby to allow the device to control the media playback unit and/or a media playback system including the media playback unit.

One embodiment provides a media playback unit wherein the networking interface includes a radio interface and wherein the computer network is a wireless network.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Particular embodiments may provide all, some, or none of these aspects, features, or advantages. Particular embodiments may provide one or more other aspects, features, or advantages, one or more of which may be readily apparent to a person skilled in the art from the drawings, descriptions, and claims herein.

DETAILED DESCRIPTION OF EMBODIMENTS

Described herein are systems and methods for providing media playback in a networked environment. In one embodiment, a networked media playback device is configured to provide a web server for delivering data indicative of a browser-renderable control interface for the networked media playback device, or for a related networked media playback system. In overview, the user of a networked device, such as a wireless web enabled device, is able to render the control interface in a web browser, and in this manner control playback of digital media via the networked media playback device or networked media playback system.

Some embodiments of the invention described herein are applicable to networked media playback devices. A networked media playback device is a hardware device capable of rendering digital media delivered to it via a computer network. In much of the description herein, wireless speakers are used as an example of networked digital media playback device. Those of ordinary skill in the art would readily be able to modify the description provided herein that is for wireless speakers and apply the methods and apparatuses to other discrete media devices. The description is provided in terms of wireless speakers in order to keep the description simple and not obscure various significant concepts. Wireless speakers are also referred to by terms such as "wireless speaker devices" and "wireless speaker subsystem units".

Some embodiments of the invention described herein are applicable to networked media playback systems. A networked media playback system is a system that allows one or more networked media playback devices connected via a computer network to render digital media. In much of the description herein, a wireless audio system is used as an example of a networked media playback system. Those of ordinary skill in the art would readily be able to modify the description provided herein that is for a wireless audio system and apply the methods and apparatuses to other digital media playback systems. The description is provided in terms of a wireless audio system in order to keep the description simple and not obscure various significant concepts.

Figure 1:
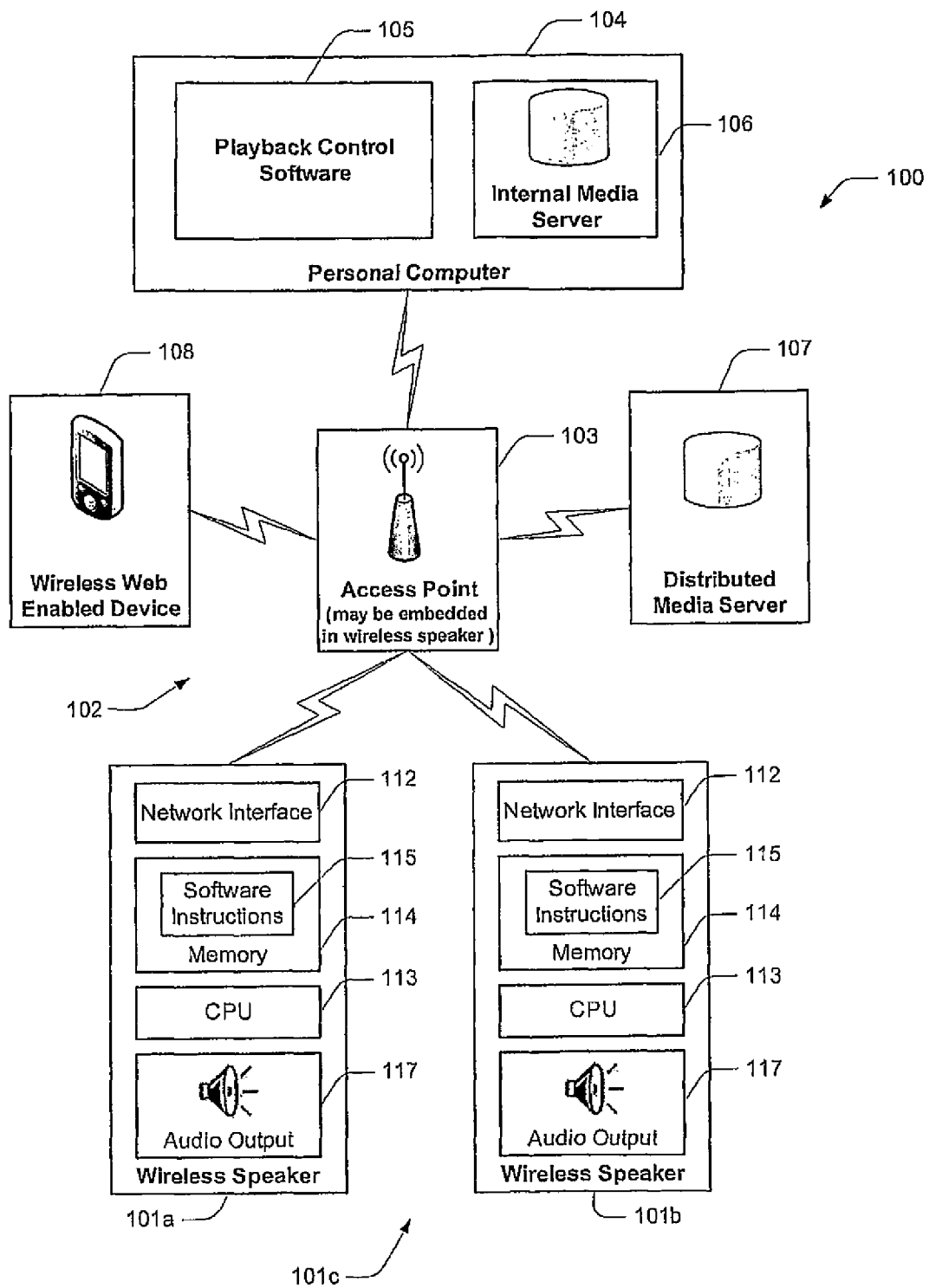
FIG. 1 shows a networked media system according to one embodiment.

FIG. 1 illustrates a basic digital media playback system 100. System 100 includes two wireless speaker devices, in the form of wireless speakers 101a and 101b. These wireless speakers are controllable individually, or collectively as a speaker set 101c. Speakers 101a and 101b connect to a wireless network 102 by way of an access point 103, in the present circumstances being a wireless network in accordance with the IEEE 802.11 standard. In some embodiments access point 103 is integrated with one of the wireless speakers.

Also connected to network 102 is a personal computer (PC) 104. PC 104 includes a memory module for maintaining software instructions indicative of a software application for coordinating playback of media via wireless speakers 101a and 101b, as well as via speaker set 101c. In the present example, this software application is identified as playback control software application 105. Also stored in the memory of PC 104 is data indicative of a plurality of media items, such as audio tracks (e.g. WAV, MP3 and other digital audio files). In this manner, PC 104 effectively provides the functionality of a media server 106.

In the present example, a distributed media server 107 is also connected to network 102. This media server, in some embodiments, includes a portable media playback device (such as an MP3 player) mounted in a networked cradle device, thereby to allow playback over the network of media items stored on the portable device.

A wireless web enabled device 108 is also connected to the network. The term "wireless web enabled device" refers to substantially any device having a web-browser application and the ability to communicate over a wireless network (such as a 802.11 type network). Common examples include personal digital music players, cellular telephones, PDAs, and the like. It will be appreciated that many consumer electronic devices adopt a plurality of these roles. Prime examples of wireless web enabled devices include the iPhone and iPod Touch, distributed by Apple Inc, which make use of the Safari web browser. As discussed further below, device 108 is used to control speakers 102a and/or 101b (and/or speaker set 101c).

Trademarks, product names, and business names used herein are provided for the sake of illustration only, and should not imply any permission, affiliation, or the like.

Each wireless speaker 101a and 101b includes a network interface 112 for connecting to network 102, in the present example via access point 102. Data indicative of command signals is received via this network, along with data indicative of digital media for playback. A central processing unit (CPU) 113 operates in conjunction with memory 114, and is responsible for rendering content, processing command signals, and the like. Memory 114 includes software instructions 115, which, among other functions, allow wireless speakers 101a and 101b to perform various methods, including methods described herein. It is noted that not all instructions required for performing these methods need be in memory 104 at a given time. Wireless speakers 101a and 101b additionally include respective audio outputs 117 (which in some embodiments includes one or more speaker cones, or other analogue outputs such as audio jacks), for allowing playback of rendered digital media as audio.

Wireless speaker set 101c does not have a discrete hardware manifestation. Rather, in the present example, wireless speaker set 101c is a virtual device embedded on (i.e. advertised by and controllable via) speaker 101a, which adopts the role of a lead speaker in the context of the set, with the speaker set operating as a stereo pair (i.e. one speaker renders and plays back a left channel signal, the other a right channel signal). This functionality is described in more detail further below. However, for the time being, it is sufficient to note that speaker set 101c provides a location to which playback instructions are able to be provided so as to affect playback of audio tracks via the speaker set.

It will be appreciated that system 100 is illustrated for the sake of example only, primarily to illustrate various components relevant to embodiments discussed herein. However, it will be appreciated that the present disclosure is equally applicable to arrangements having a greater or lesser deal of complexity as compared with system 100. For example, in further embodiments there are a larger number of wireless speakers, which might include a plurality of individual wireless speaker sets. For the sake of the present disclosure, the following terminology is used:

Wireless speaker. This is an individual wireless speaker (also refereed to as a "wireless speaker device" or "wireless speaker subsystem unit"), being an individually discoverable and controllable device that receives digital audio streamed over a network, and renders that data to provide an analogue output. In some cases the analogue output is provided via one or more speaker cones, and in other cases via an audio output jack or the like.

Wireless speaker group. A wireless speaker group (or "group") includes a plurality of wireless speakers (although in some embodiments a wireless speaker group may be defined to include only a single wireless speaker). In some embodiments a wireless speaker group presents a single virtual device interface for receiving playback/control commands directed to the group as a whole (e.g. commands are provided to that interface which resides on one of the physical speakers, and those commands are processed for appropriate implementation amongst the individual speakers). Generally speaking, a wireless speaker group is defined for a set of wireless speakers that are, in practical terms, intended to operate as a collective. Common examples include stereo pairs, or multi channel surround sound arrangements (such as 5.1 channel surround sound).

Wireless speaker zone. A wireless speaker zone (or "zone") includes at least one wireless speaker group, in combination with one or more further wireless speakers and/or wireless speaker groups. In the present embodiments, zones are defined for the sake of convenience, rather than practical necessity. For example, zones are generally defined to allow synchronous playback of audio across a region, such as a floor of a house, or a house as a whole. In some embodiments a wireless speaker zone presents a virtual device interface for receiving playback/control commands directed to the zone as a whole. The constituent groups and/or speakers also provide respective virtual interfaces, for example to allow volume individual control across portions of the zone.

In general, detailed considerations in respect of the operation and interoperation of speakers, groups and zones falls beyond the scope of the present disclosure, which requires only a general understanding of the meaning of these terms.

Figure 2A:
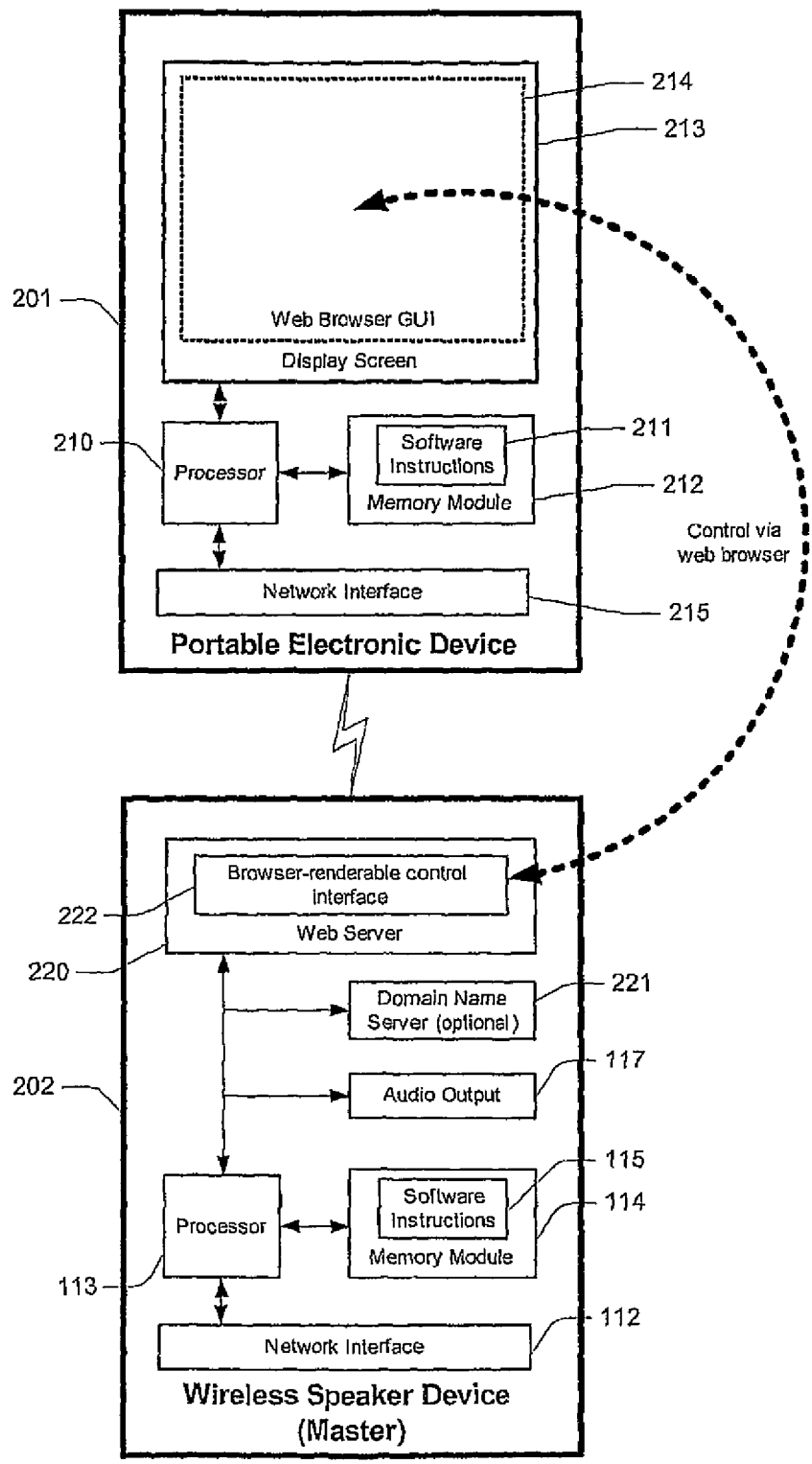
FIG. 2A shows a networked media system according to one embodiment.

FIG. 2A provides a schematic representation showing a wireless web-enabled device 201 and a wireless speaker device 202. In overview, device 201 is used to control wireless speaker 202, for instance in the manner described below by reference to methods 300 and 310 of FIG. 3.

Device 201 includes a processor 210 coupled to a memory module 211, this memory module maintaining software instructions 212. Software instructions 212 allow processor 210 to execute a web browser application 213, schematically shown as a GUI on a display screen 214. Various web browser applications executable on portable devices are known, these generally including similar functionalities (for example the ability to render HTML content). Device 201 also includes an 802.11 type network interface 215.

Wireless speaker 202 includes generally the same components as wireless speaker 101a, and these are afforded corresponding reference numerals. Speaker 202 additionally provides a web-server 220 and, in some embodiments, a domain name server 221, It will be appreciated that these are effectively processes provided by way of software instructions 113 executing on processor 113. Web server 220 makes available data indicative of a browser renderable control interface 222, including HTML data for allowing the rendering of one or more web pages by way of browser application 213.

As noted, the provision of a domain name server is optional. In some embodiments the wireless speaker provides the only domain name server on the network. However, in many cases there will be an existing domain name server on the network. Often, it is often preferable to avoid the introduction of a further domain name server. However, some embodiments described herein make use of a domain name server in the speaker itself to allow resolution of a predetermined control URI to the control interface provided by way of the speaker's web server. Other embodiments make use of a remote server arrangement to achieve a similar goal.

In the present embodiment, wireless speaker 202 provides access point functionality. For example, wireless speaker 202 advertises a wireless network having its own SSID, allowing other components to connect to that network (referred to herein as the "speaker network"). This allows other components on the network (such as control devices, other wireless speakers, and in the present example device 201) to connect to that network. In some embodiments, connection to the speaker network requires a degree of authentication/authorization.

In other embodiments a third party access point is used. In some such embodiments, speaker 202 provides a virtual access point, and leverages the existing third party access point.

Figure 3A:
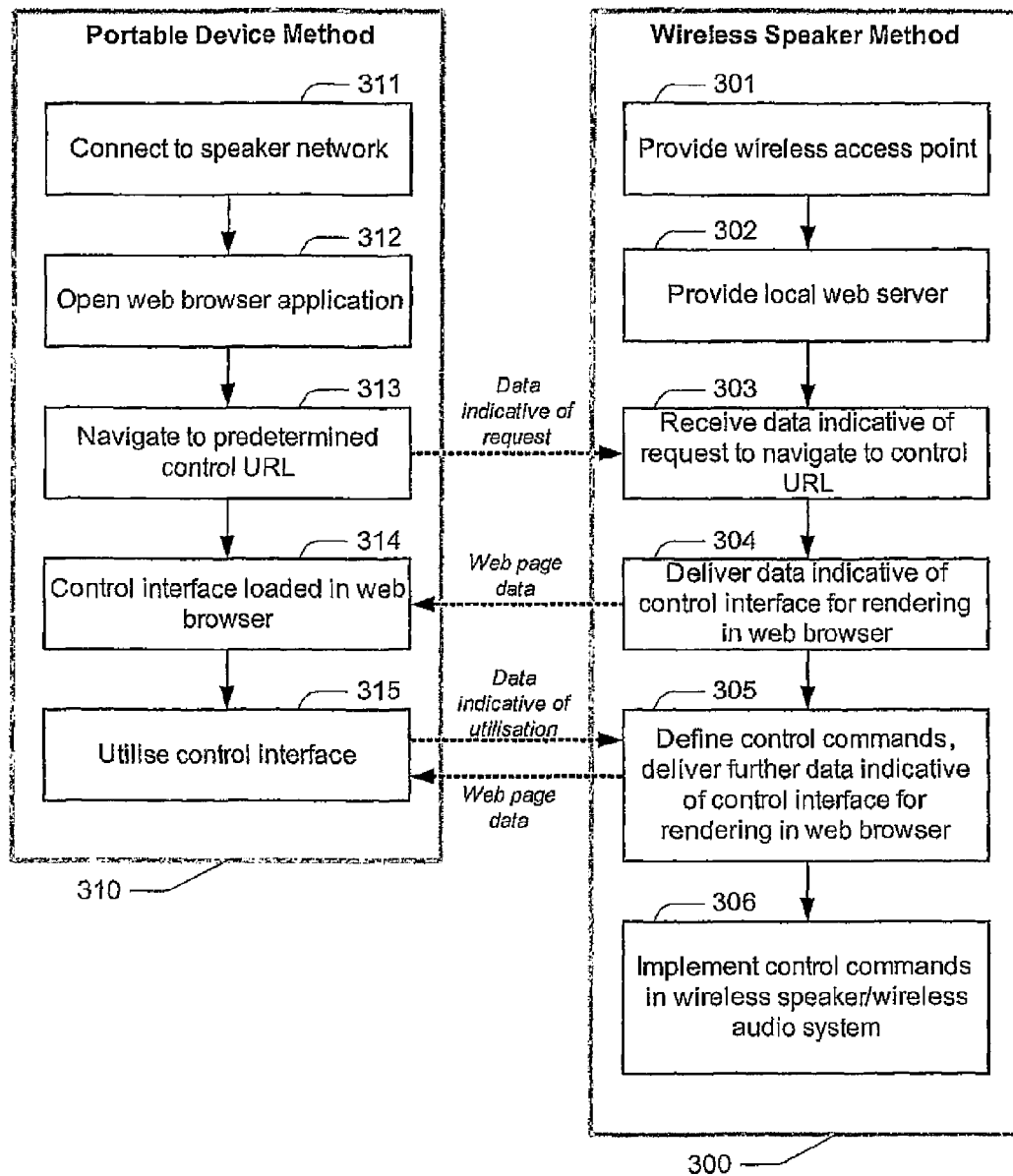
FIG. 3A shows a method performed by a wireless web-enabled device according to one embodiment and a method performed by a wireless speaker according to one embodiment.

FIG. 3A illustrates methods 300 and 310, performed respectively by speaker 202 and device 201. These methods are described to assist in understanding the approach implemented according to the present embodiments for allowing device 201 to provide control commands to speaker 202 without the need for special software.

Dealing initially with method 310, at step 311 device 201 connects to the speaker network. For example, using software supplied to manage the operation of wireless network interface 215, the speaker network is selected by way of its SSID from a list of available networks. At step 312 the web browser application is launched (it will be appreciated that, in some cases, this may precede step 311). At step 312 the browser is used to navigate to a predetermined control URL. For example, the predetermined control URL is inputted into an address bar of the web application, or a link is clicked. In some embodiments, upon connecting to the speaker network, navigation to the predetermined control URL is automatic upon each launching of the browser application.

In the example of FIG. 3A, the predetermined control URL is a simple web address inherently descriptive of the functionality under consideration, such as www.speakercontrol.com. To allow the use of such a web address, a local domain server is used to resolve the URI. In the present example, domain name server process 221 allows speaker 220 to resolve this URI. In this manner, the user is directed to the local control interface for the speaker network to which device 201 is connected.

Step 314 includes loading the control interface, or one page thereof, in the web browser application, for example by rendering HTML and/or other web page data. This control interface allows for browser-based control of either a single wireless speaker, or a wireless audio system (in some embodiments a user is able to select between speaker control or system control).

Step 315 includes utilizing the control interface. This step of "utilizing" varies in nature between implementations, dependent to a greater extent on the content and complexity of the control interface. Numerous approaches to providing a browser-based control interface are known in the art, and the present disclosure should not be limited to any single such approach. For example, combinations of any of HTML, DHTML, ActiveX controls, Flash objects, JavaScript, and the like are used in various embodiments.

In some embodiments, noting the application to portable devices, the control interface is relatively rudimentary to account for the simple nature of many portable web browser applications. For example, in some embodiments, HTML-based buttons and the like are provided, and manipulation of these results in data being transmitted from the browser to the web server. In one simple embodiment, the control interface provides a display showing current operational characteristics of the speaker (playback status, volume, etc), and allows a user to enter modified operational characteristics. Subject to a postback event, the modified operational characteristics are transmitted to the web server to allow implementation of those modified operational characteristics. The control interface is, in some cases, then re-rendered to display the modified operational characteristics as current operational characteristics.

Dealing now with method 300, step 301 includes providing a wireless access point. This is, in the present embodiment, performed at the time speaker 202 is initialized. Step 302 includes providing a local web server. This includes commencing a web server process based on locally stored software instructions.

The term "local web server" generally describes a process that runs on the wireless speaker and listens for requests to deliver browser renderable content (for example when a user of a web-browser navigates to a web page deliverable by the local web server). The wireless speaker also maintains web page data (such as HTML and/or other data) indicative of one or more web pages that are deliverable by the web browser. One or more of these pages provides a browser-renderable control interface for the wireless speaker or wider wireless speaker group/zone. The term "browser-renderable control interface" generally describes one or more web pages that are renderable in a web browser application. The page or pages provide control features, which allow a user to apply operational changes to the wireless speaker of to the wireless speaker group/zone (for example, these operational changes might be used to control playback of audio via the speaker or speakers).

Step 303 includes receiving data indicative of a request to navigate to the control URL, this being triggered by step 313. Step 304 includes delivering data indicative of the control interface for rendering in the web browser. In some embodiments, this step includes dynamically generating HTML for one or more web pages. For example, in some embodiments the HTML is dynamically generated based on analysis of current operational characteristics for the speaker/system.

Step 305 includes defining control commands corresponding to utilization of the control interface. Step 305 also includes delivering further data indicative of the control interface. For example, utilization of the interface may result in navigation to other pages, or require the updating/re-rendering of the current page (or one or more page elements thereof).

The defining of control commands, in some embodiments, includes the speaker adopting a role as a control device (for example a control device in accordance with the UPnP framework). Generally speaking, a translation protocol is established such that data received from utilization of the control interface is able to be converted into UPnP commands. For example, upward modification of a volume value in the control interface is translated into a UPnP command to increase volume. This is particularly advantageous where other devices (i.e. other than speaker 202) are affected by the utilization of the control interface.

A particularly important category of command is a playback command, which is indicative of an instruction to commence/cease playback of a particular audio track. In some embodiments, the control interface only allows simple commands such as "play" and "stop". However, in other embodiments the control interface additionally allows a user to select one or more tracks (in the case of multiple tracks, these may define a playlist) for playback. Some examples along these lines are considered below.

In one embodiment, the control interface allows the user to browse media stored at UPnP media servers on the speaker network. Where device 201 maintains UPnP media server software, this may include locally stored media.

In one embodiment, speaker 202 scans the memory of device 201 and defines a list of available media files. These files are advertised by speaker 202 in the capacity of a media server. Where a playback command is received in respect of one of those files, speaker 202 obtains and uploads the relevant file, such that streaming can commence from speaker 202. In some cases streaming commences prior to the completion of upload. In this manner, device 201 is effectively able to operate as a media server, although media server software is not installed.

In one embodiment, the control interface allows the user to browse locally stored media (i.e. media stored on the memory of device 201). This might include either or both of individual media files and/or playlists. Assuming device 201 does not support streaming of media files over a wireless network, the selected files are uploaded to speaker 202 for playback, which takes on a role as a UPnP media server for those files. In some cases the uploading of such files is temporary only, such that copies are not permanently retained. In some embodiments, rather than uploading the files to speaker 202, they are uploaded to another device on the speaker network (such as to a distributed media server).

It will be appreciated that the final example is simpler where device 201 implements a conventional file system, given that a relatively rudimentary browse/upload interface is able to be used in such cases. However, in some embodiments, media storage on device 201 is maintained in a non-conventional file system. In some such cases, the control interface varies depending on the make/model/etc of device 201. In some cases the control interface includes an initial page that prompts the user to identify the device being used to facilitate determination of appropriate subsequent pages.

Figure 2B:
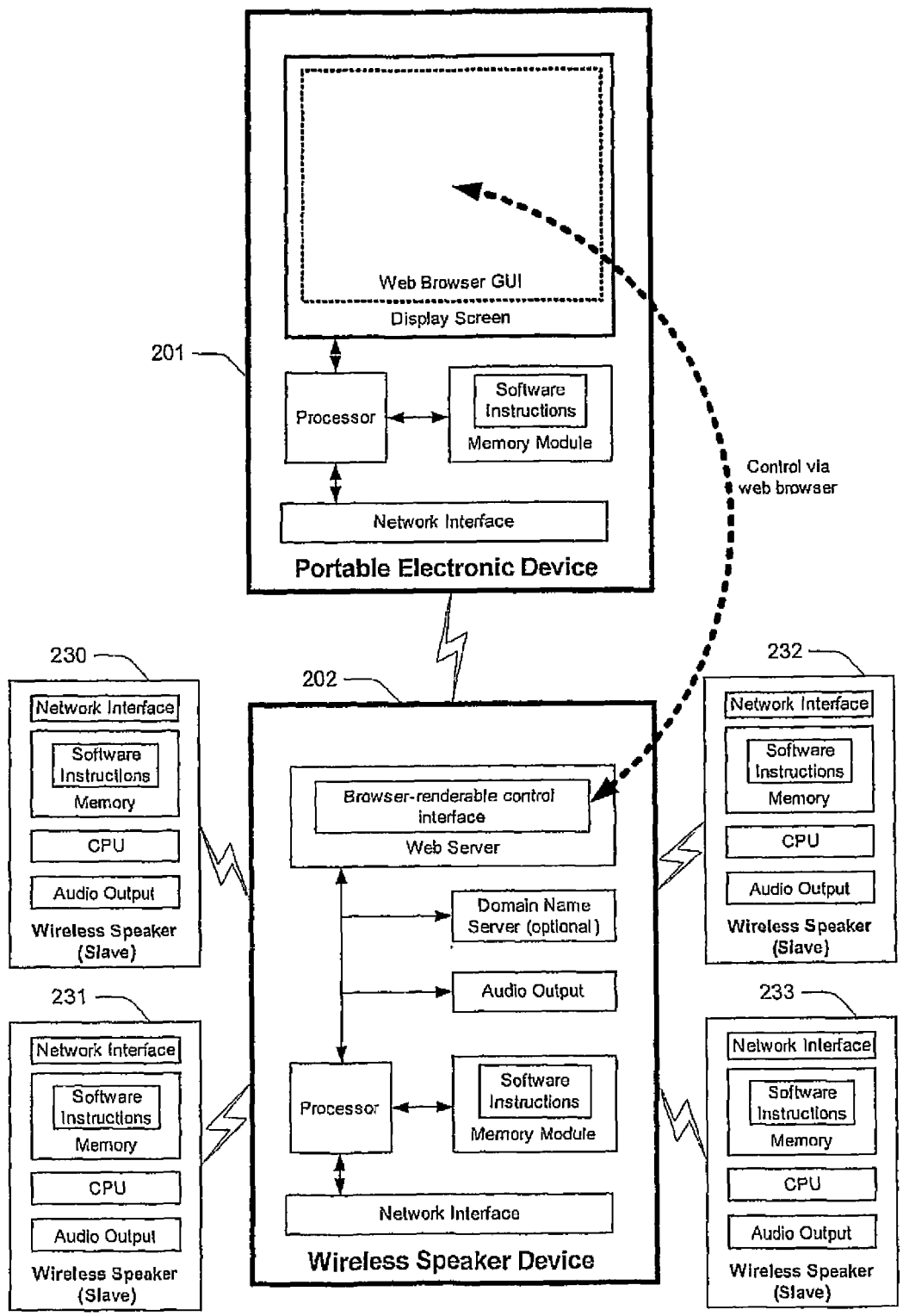
FIG. 2B shows a networked media system according to one embodiment.

Step 306 includes implementing the control commands in the wireless speaker, or in a wireless audio system. In the case of the latter, and as shown in FIG. 2B, speaker 202 operates as a master speaker in conjunction with a plurality of slave speakers. The web server is provided by the master speaker, and commands received at the master speaker are applied across the master speaker and slave speakers.

In another embodiment, the web server is provided by a slave speaker of a wireless audio system, and a control command received by the web server is provided in accordance with the UPnP interface to the master speaker, such that the master speaker implements the command.

Generally speaking, only a single one of the speakers on a given speaker network should provide a web server as discussed herein. To this end, where multiple speakers are connected to a network, those speakers in some embodiments self arrange to determine which should provide the web server (i.e. a master/slave determination). In some cases only one of the speakers is configured from a hardware perspective to provide an access point, and in such cases determination is relatively straightforward (as that device is inherently configured to provide the web server). However, in other embodiments alternate approaches are used. Additional discussion of wireless speaker systems, virtual devices representative of those systems, and arbitration between master/slave speaker devices, is provided further below, particularly by reference to sub-process 502 of FIG. 5.

Figure 3B:
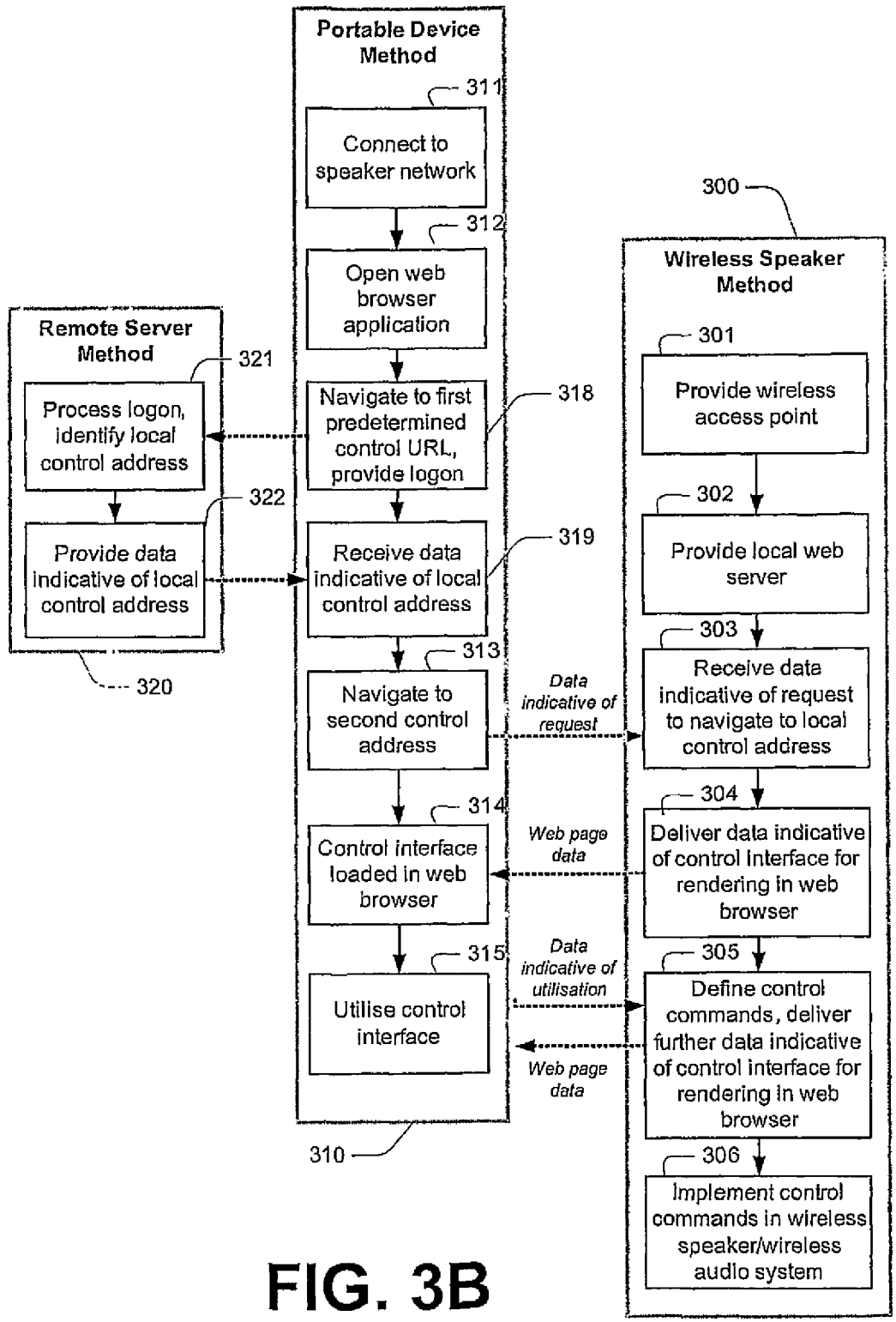
FIG. 3B shows a method performed by a wireless web-enabled device according to one embodiment, a method performed by a wireless speaker according to one embodiment, and a method performed by a remote server according to one embodiment.

FIG. 3B illustrates a variation on the methods of FIG. 3A. In the example of FIG. 3A, a local domain server is used to resolve a URI inherently descriptive of control functionality. In the example of FIG. 3B, an alternate approach is used, generally involving the use of a remote server which associates user data with speaker addresses. This is described in more detail below.

Figure 2C:
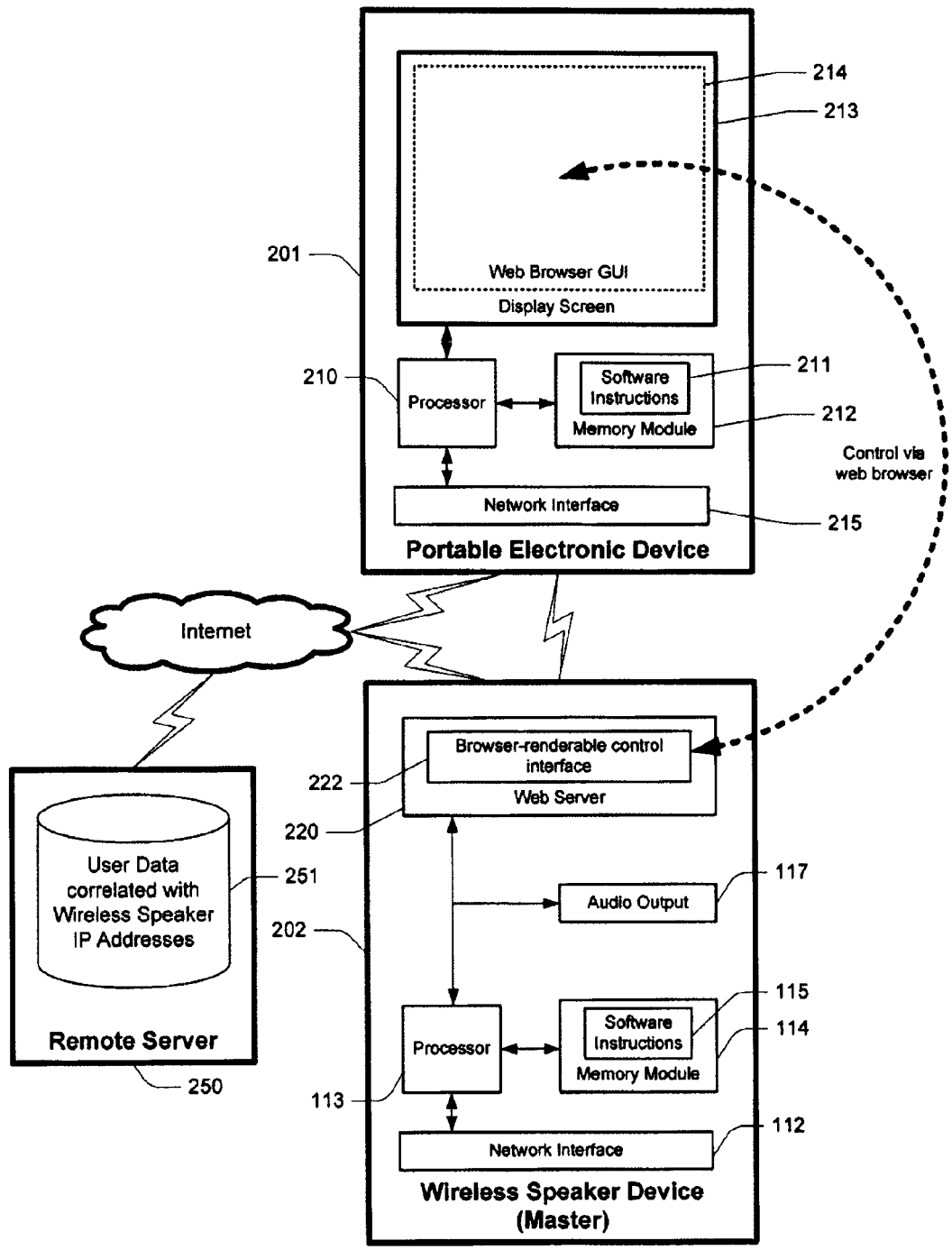
FIG. 2C shows a networked media system according to one embodiment.

A general arrangement underlying FIG. 3B is shown in FIG. 2C. In overview, a remote server 250 communicates with either or both of device 201 and speaker 202 over the Internet. For example, in some embodiments this is made possible by a DSL modem or other form of Internet connection available on the speaker network. Server 250 maintains a database 251 which correlates user data with wireless speaker IP addresses.

In one embodiment, during the configuration of wireless speaker 202, a user defines user data for that speaker, which may take the form of a username/password combination. These are in some cases wholly or partially predefined. The username is used to uniquely identify wireless speaker 202. Wireless speaker 202 transmits data indicative of its username to remote server 250, along with data indicative of its IP address. The data is re-transmitted periodically, for example upon alteration of the IP address. It will be appreciated that the speaker's IP address might change over time, in some cases under the influence a DHCP.

Server 250 provides a website whereby a user is able to log on by way of the user data (for example by providing a username/password), and by doing so receive the IP address for speaker 202. In particular, a user navigates by way of a web browser running on device 201 to a URL such as www.speakercontrol.com, which is resolved to access the website provided by server 250. The user then provides the relevant user data, and is provided a link indicative of the IP address for speaker 202. In other embodiments the browser is automatically redirected to that IP address. In this manner, device 201 provides the "predetermined request" in response to which the speaker begins delivering data indicative of the control interface. This allows resolution of a local speaker address based on a generic URL, although without a need to perform local resource resolution.

In the context of FIG. 3B, method 300 remains generally unchanged. However, method 310 includes additional steps 318 and 319. Step 318 includes navigating to a first predetermined control URL, such as www.speakercontrol.com, and providing a logon (for example in terms of a username/password combination). In response, assuming logon is successful, device 201 receives from server 250 data indicative of a local control address. In this instance, step 313 includes navigating to this second control address, and step 303 correspondingly includes receiving data indicative of a request to navigate to the local control address.

FIG. 3B also illustrates a method 320 performed by server 250. Method 320 includes, at step 321, processing a logon, and identifying a local control address. This is achieved by querying database 251. Step 322 includes providing data indicative of the local control address to the browser responsible for the logon (i.e. device 201).

In some embodiments server 250 maintains additional data regarding the configuration of speakers on the speaker network. In this manner, server 250 is able to provide links to control addresses for individual speakers, groups and/or zones defined on the local speaker network. These are identified by reference to descriptive names defined locally. For example, in one embodiment navigates to www.speakercontrol.com, performs a logon, and is provided links to the likes of "bedroom speaker system", "lounge room surround system", and so on. This allows the user to select which speaker or speakers are to be controlled by way of device 201. An example of speaker arrangements within a house is described further below by reference to FIG. 17.

Figure 4A:
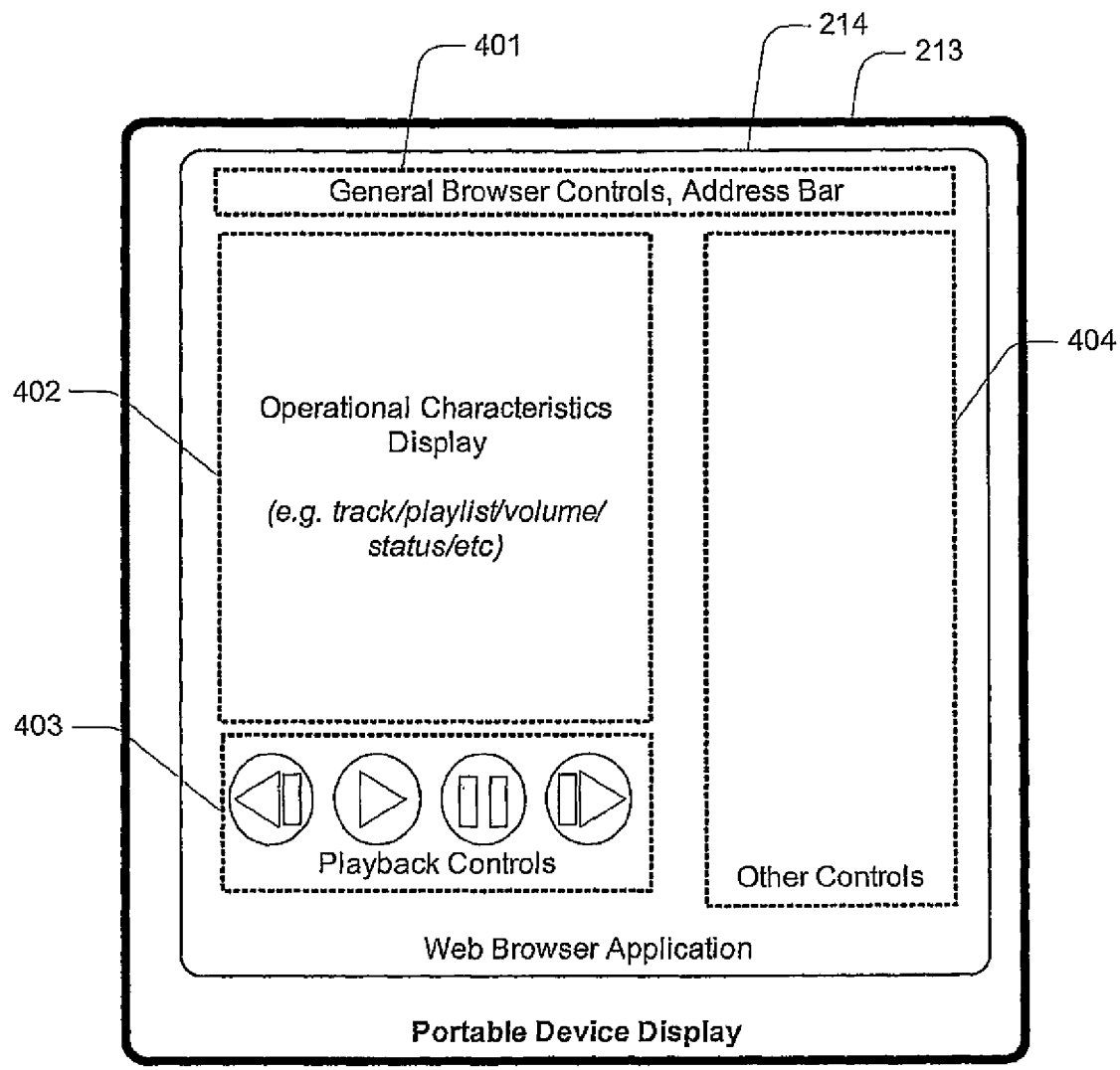
FIG. 4A shows an exemplary screenshot according to one embodiment.

FIG. 4A illustrates an exemplary screenshot of a control interface according to one embodiment, as rendered in a web browser. This screenshot, along with others provided herein, is schematic only and should not be regarded as necessarily limiting in any way. That is, screenshots provided are illustrative of relatively rudimentary interfaces, substantively simplified to facilitate convenient understanding of significant features and functionalities. Those skilled in the art will appreciate how interfaces having varied appearances might be implemented in practice, whilst preserving such features and functionalities.

The present screenshot shows a region 401 for containing standard browser controls, such as an address toolbar, menu toolbars, navigation toolbars, and the like. Region 402 displays data indicative of current operational characteristic, such as the volume at which the speaker/system is set, playback status (in terms of play/stop, and track/playlist), and the like. Region 403 provides general playback control buttons, such as play, stop, next track, and so on. Region 404 provides other control, which vary between implementations.

Figure 4B:
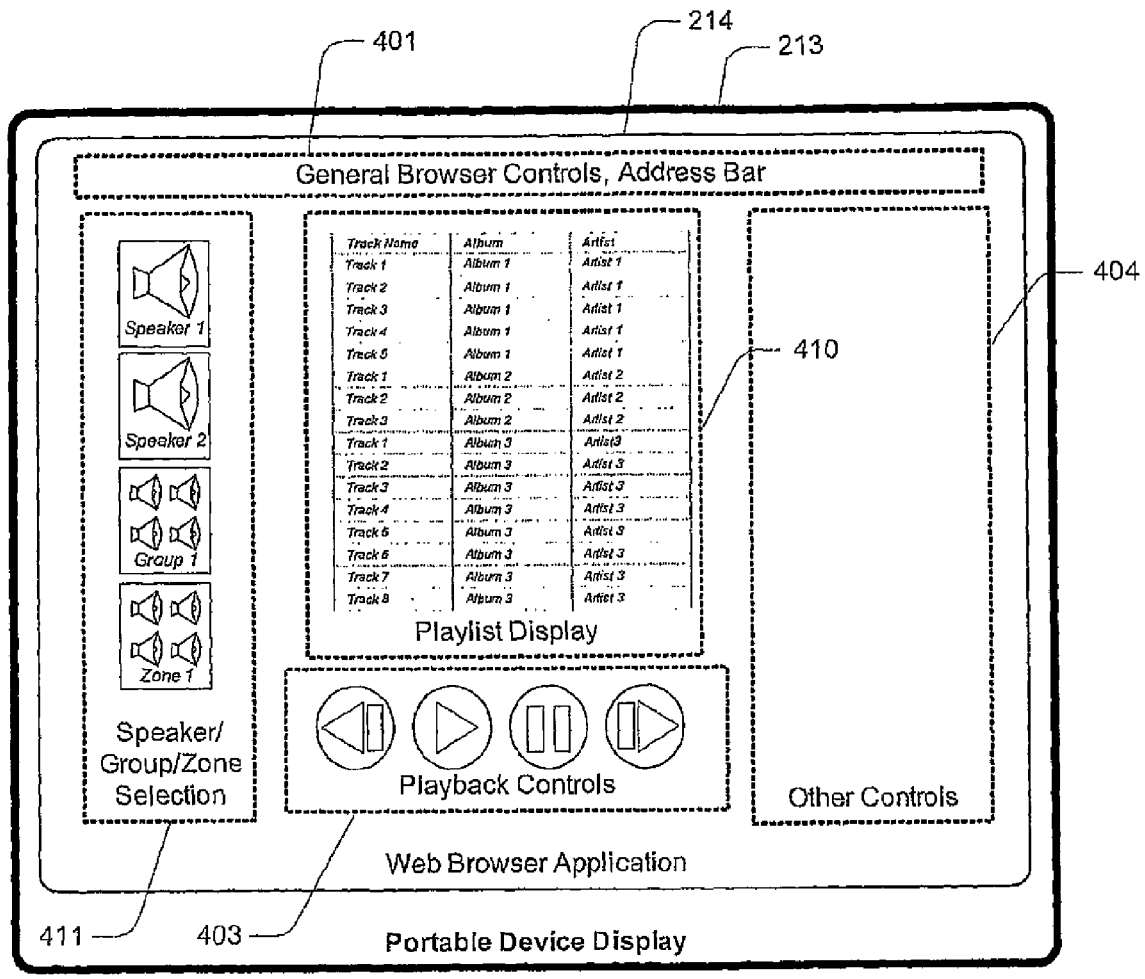
FIG. 4B shows an exemplary screenshot according to one embodiment.

FIG. 4B illustrates a screenshot from a more complex control interface. In this example, a playlist display region 410 is shown for providing a graphical representation of media that is designated for playback, much in the same way as a conventional software based media player. Additionally, region 411 allows a user to select between one or more available groups, zones and/or individual speakers to control. In overview, the control interface under consideration is able to be used to control a plurality of speakers/groups/zones, a by way of region 411 the user is able to select which of those is to be controlled at a given time.

The web pages that when rendered provide control interfaces are, in some embodiments, dynamically generated based on up-to-date information received over the network. For example, a repository of page data maintains various objects and the like which are able to be dynamically built to form appropriate web pages (e.g. using DHTML) as is common in the field. For example, in one embodiment at runtime a page generation engine is responsive to current data (such as data indicative of available speakers/groups/zones) for building an appropriate web page for rendering n a browser as a control interface.

The method by whish commands provided via the web pages are converted into playback control commands varies between embodiments. For example, in some cases data received from a web page is translated to provide a standard control signal (such as a standard UPnP control signal).

Figure 5:
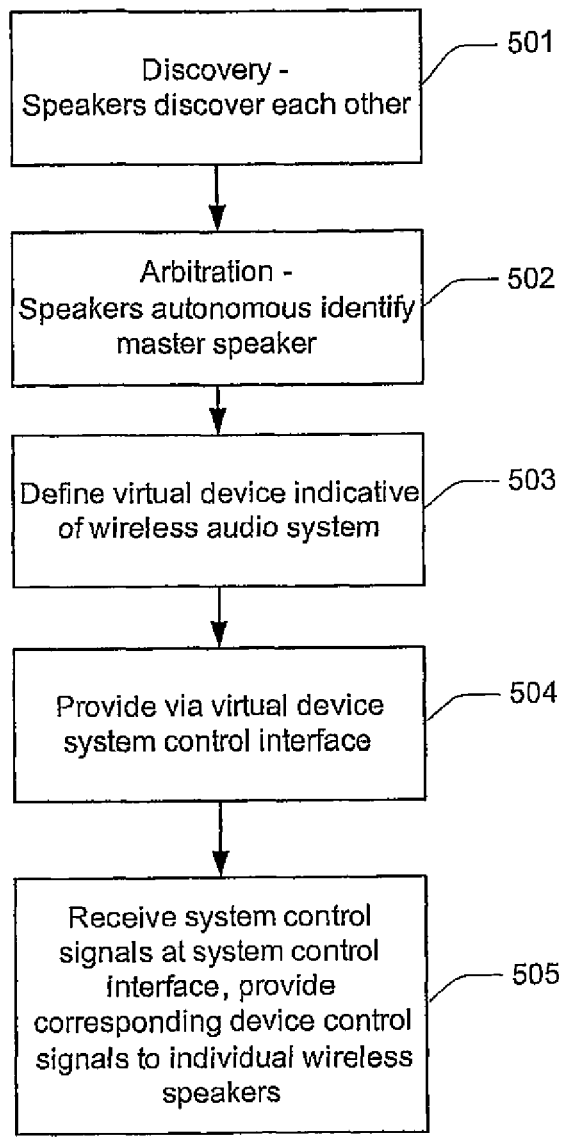
FIG. 5 shows a flowchart of one method embodiment for providing a wireless audio system.

As further context, FIG. 5 is a flowchart that illustrates a method for providing a multimedia system in the form of a wireless audio system. In overview, several individual wireless speaker subsystems are activated, each wireless speaker subsystem including a wireless network interface for allowing connection to a wireless network, e.g., a wireless local area network (WLAN) conforming to the IEEE 802.11 standard. These wireless speaker subsystems connect to a common wireless network—for example by association to an open access point.

The method of FIG. 5 is described by reference to a number of sub-processes. It will be appreciated that in various embodiments these sub-processes are performed in parallel or series. Sub-process ordering and particular examples should not be regarded as limiting.

Sub-process 501 represents a discovery sub-process where the wireless speaker subsystems are discovered by one another and by other devices on the network. In practical terms, discovery is a process whereby networked devices—including the wireless speaker subsystems and other devices—share data indicative of themselves and advertise their respective capabilities. For example, a wireless speaker subsystem advertises capabilities including wireless audio playback. A significant result taken from sub-process 501 is that the wireless speaker subsystems discover one another. Sub-process 501 is discussed in greater detail further below by reference to a specific example.

At sub-process 503 a virtual device is defined. A virtual device is a device which presents a single proxy interface to a collection of networked media devices to allow for a single control interface to these devices. Furthermore, a virtual device is a networked device that does not have a conventional hardware manifestation. Both the terms "group" and "zone" as used in this disclosure are virtual devices. In the example described herein, the virtual device is referred to as a "group" because it represents a plurality of networked multimedia devices (the wireless audio system).

In the present embodiment, a virtual device (a group or a zone) does not have a conventional hardware manifestation in the sense that the wireless audio system includes several individual wireless speaker subsystems. Virtual devices are discoverable on a network in the same way as physical devices. Physical devices communicate with virtual devices as they would with other physical devices. In the present embodiment a virtual device has its own IP address. In other embodiments however a virtual device does not have IP addresses, for example as a result of a lower-level protocol running atop that virtual device. In some embodiments a virtual device includes one or more virtual sub-devices, and the virtual device has an IP address whilst the virtual sub-devices may or may not have respective IP addresses.

At sub-process 504 a system control interface is provided via the group. This interface is enabled for receiving a system control signal indicative of an operational change to the wireless audio system. In particular, a signal or message provided to the group (for example by using the IP address of that device) is received by the system control interface. The term "operational change" should be read broadly to include substantially any change in state of any device either physical or virtual. For example: in the present context operational changes might include wireless speaker subsystem volume adjustment, other audio amplification settings, media playback control, and so on.

Providing the system control interface in some embodiments includes advertising on the network the group—for example in accordance with one or more open or other proprietary networking protocols. The group advertises the capability of a wireless audio system, and this capability is discoverable and controllable on the network. A user wishing to apply an operational change across the wireless audio system—such as a volume adjustment—provides a system control signal indicative of this change to the group. This is dealt with at sub-process 505.

At sub process 505, a system control signal is received. In response to the system control signal, corresponding device control signals are provided to each of the wireless speaker subsystems to implement the operational change across the wireless audio system.

The term "system control signal" refers to a signal, message or data packet that is directed to the group for applying an operational change across the wireless audio system. A device control signal is a signal, message or data packet that is directed to an individual wireless speaker subsystem for applying an operational change to that particular wireless speaker subsystem. In some embodiments a single device control signal is concurrently provided to a plurality of individual wireless speaker subsystems, such as by way of message broadcast.

In the present embodiment, one of the wireless speaker subsystems is responsible for implementing sub processes 503 to 505. That is, one of the wireless speaker subsystems defines the group representative of the wireless audio system, provides the system control interface, and is responsive to system control signals for implementing the desired operational changes across the system. Achieving this includes the step of identifying among the wireless speaker subsystems a wireless speaker subsystem, also called a leader wireless speaker subsystem. More specifically, in the present embodiment between sub-processes 501 and 503 there is an arbitration sub process 502 where each speaker subsystem autonomously decides whether it is to be the leader speaker subsystem based on a predefined comparison protocol. In one embodiment this is performed on the basis that all speaker subsystems on the network are aware of each other.

Various comparison protocols are used among embodiments. For example, in some embodiments each speaker subsystem includes a unique hierarchical identifier, and periodically broadcasts this identifier for reception by other speaker subsystems. In this way each speaker subsystem is able to compile a list of speaker subsystems on the network and their corresponding hierarchical identifiers, and as such make an autonomous decision as to whether or not it is to become the leader. Some further comparison protocols used in other embodiments are discussed further below.

Wireless speaker subsystems that do not determine that they are leader wireless speaker subsystems inherently become slave wireless speaker subsystems, also called member wireless speaker subsystems, and as such do not implement sub processes 503 to 505. As new wireless speaker subsystems connect to or otherwise appear on the network they scan the network for existing devices, and under certain conditions join existing wireless audio systems. Where a wireless speaker subsystem is not a leader wireless speaker subsystem, that wireless speaker subsystem implements a join sub-process in 506 to confirm its place in a wireless audio system. Join sub process 506 is not shown in FIG. 5 for the sake of simplicity, however it will be appreciated that it is performed following sub-process 502 by a wireless speaker subsystem that determines itself not to be a leader wireless speaker subsystem. An example of sub-process 506 is found in FIG. 12.

Figure 6:
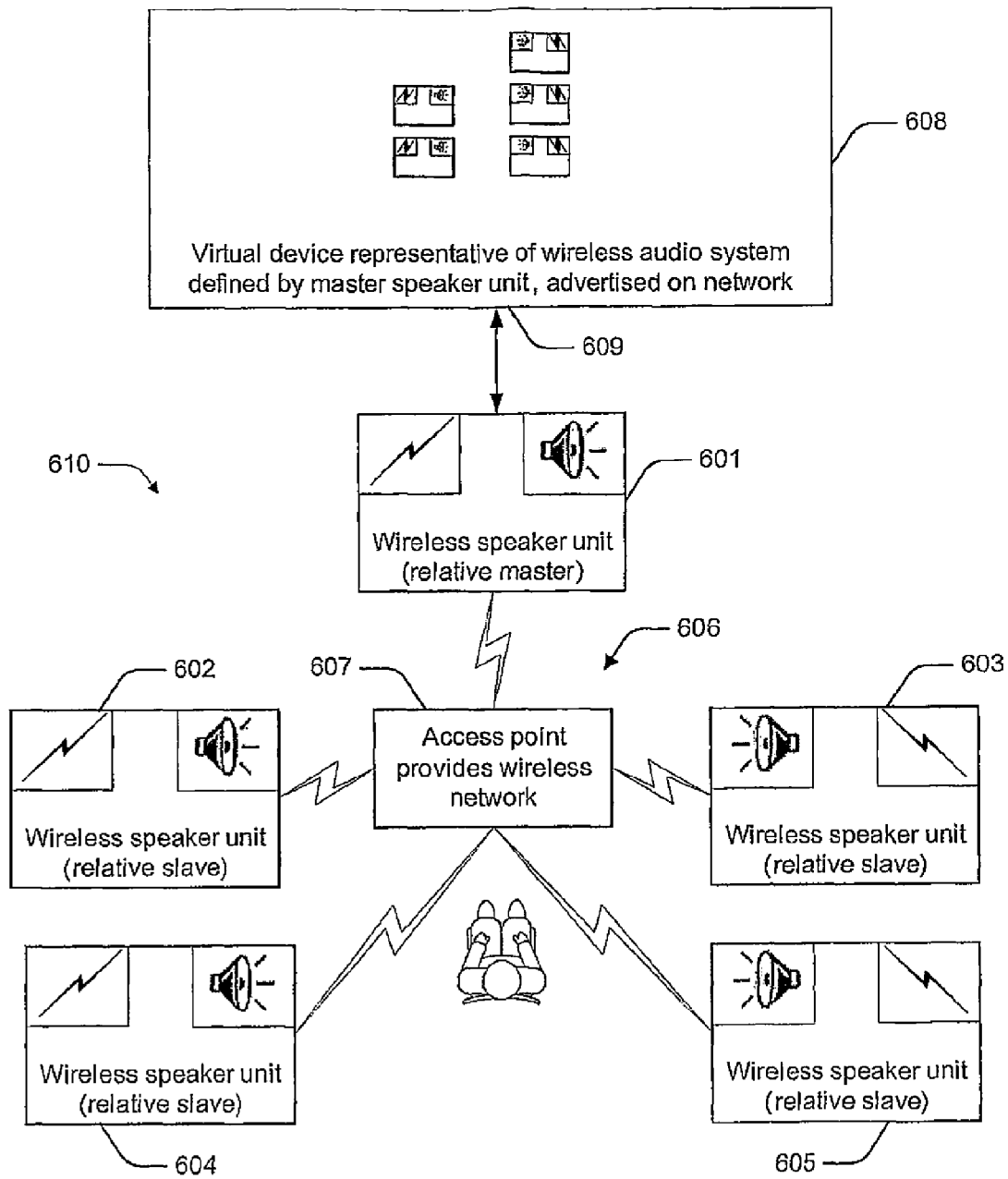
FIG. 6 schematically illustrates a wireless audio system embodiment including a plurality of wireless speaker subsystems.

FIG. 6 shows a wireless audio configuration including five wireless speaker subsystems 601 to 605. These wireless speaker subsystems are activated and automatically connect to a wireless network 606. Network 606 is provided by an open access point 607, and in connecting to network 606 each of the wireless speaker subsystems associate to access point 607. Access point 607 is "open" in the sense that wireless speaker subsystems 601 to 605 are able to associate without the need to grant in advance special permissions. In some embodiments such permissions are required. A method in line with that disclosed in FIG. 5 is carried out to provide a wireless audio system 610 including wireless speaker subsystems 601 to 605. In particular, a group 608 is defined, this device being representative of wireless audio system 610. Group 608 provides a system control interface 609 which receives system control signals for implementing operations changes across system 610.

From a terminology point of view, group 608 describes a discoverable group on network 606 that provides a capability in the form of a wireless audio system. System 601 describes the hardware making up the wireless audio system—including individual wireless speaker subsystems 601 to 605.

Although in FIG. 6 group 608 is shown as being separate from the leader wireless speaker subsystem, it will be appreciated that in a practical sense the group exists within and shares the hardware of the leader wireless speaker subsystem. Whilst messages are sent directly to the group, in a physical sense those messages are received by the network interface of the leader wireless speaker subsystem. This network interface may be a physical device such as a network interface, or alternately a logical interface.

Wireless speaker subsystems 601 to 605 have not been pre-configured to act as a group. They are off-the-shelf wireless speaker subsystems that, as discussed below, implement instructions to substantially autonomously arrange themselves to provide a wireless audio system such as system 610.

In the present embodiment wireless speaker subsystems 601 to 605 are provided by a single manufacturer, and as such implement generally the same protocols and procedures. They are of the same or a similar model—similar in that they may differ in details such as color, appearance, in size or speaker cone configuration. Each wireless speaker subsystem is uniquely identifiable electronically by one or more respective identifying features, such as unique MAC addresses. In other embodiments several different makes of wireless speaker subsystem are used.

Once activated, wireless speaker subsystems 601 to 605 undergo a discovery process in sub-process 501. There are a number of known discovery protocols that manage precisely how discovery takes place. In various embodiments of this invention discovery protocols such as Universal Plug and Play (UPnP) Bonjour and Jini are used, as well as proprietary discovery protocols. Bonjour is a general method to discover services on a local area network, and was formerly called Rendezvous. It is Apple's trade name for its implementation of the Zeroconf specification framework. For Jini, see www.jini.org.

Figure 7:
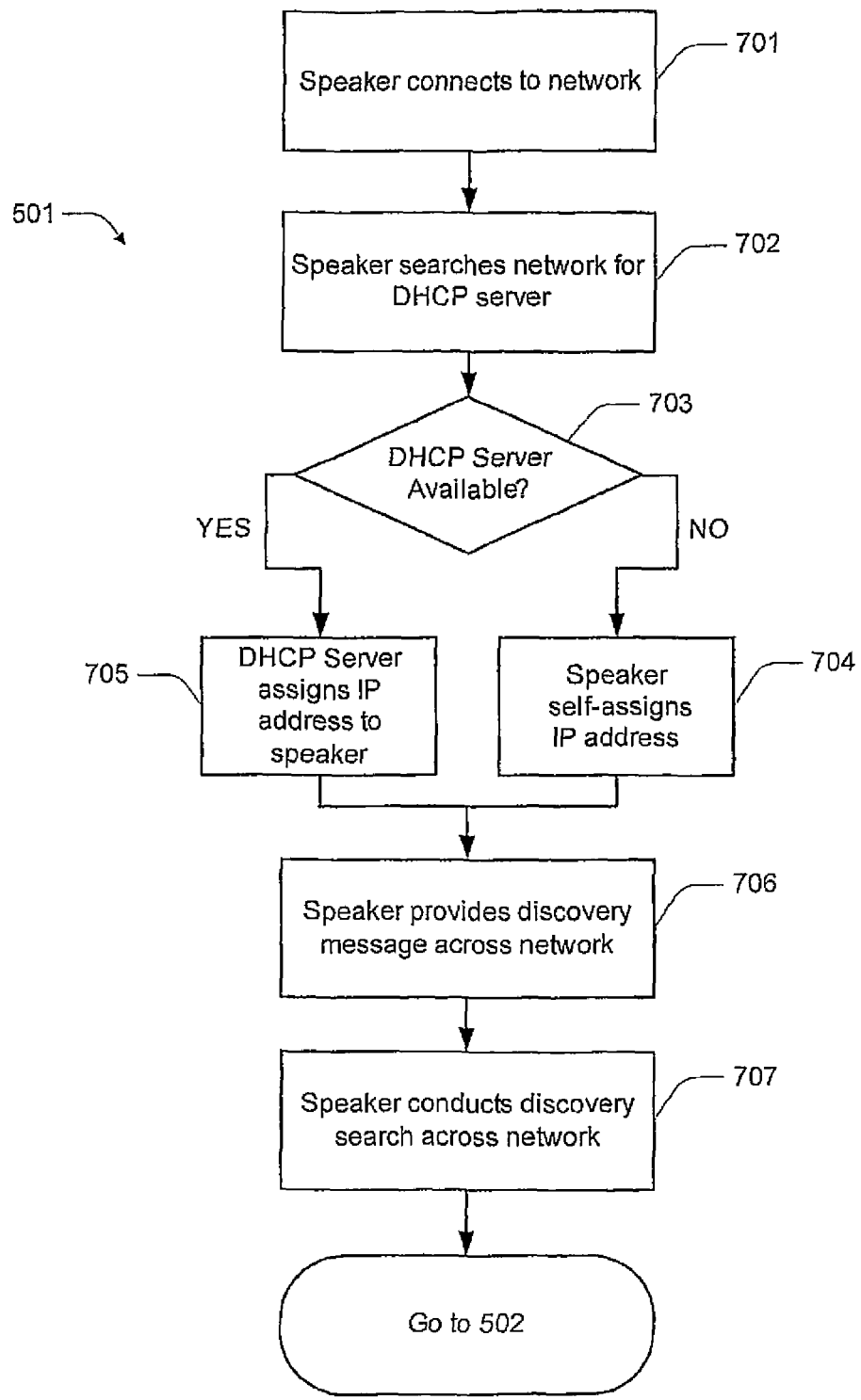
FIG. 7 shows a flowchart of an embodiment of a method performed by a wireless speaker subsystem.

The discovery process used in the present embodiment is shown in FIG. 7, and described below by reference to wireless speaker subsystem 601. It will be appreciated that this is provided as an example only, and in other embodiments other discovery processes are used.

Wireless speaker subsystem 601 connects to network 606 at step 701 in sub-process 501. Wireless speaker subsystem 601 implements Dynamic Host Configuration Protocol (DHCP) client, which searches for a DHCP server at step 702. Such a server is generally responsible for the assignment of IP addresses across a network, such as network 606. If, at decision 703, no DHCP server is available, wireless speaker subsystem 601 self-assigns an IP address at step 704. Otherwise, an available DHCP server assigns an IP address to wireless speaker subsystem 601 at step 705. In either case, the LP address assigned is used by wireless speaker subsystem 601 in subsequent network operations.

Once an IP address is assigned, the wireless speaker subsystem 601 advertises itself across network 606 at step 706. In particular, wireless speaker subsystem 601 provides a discovery message that communicates to wireless speaker subsystems 602 to 605 and other devices on network 606 a relatively small data packet indicative of wireless speaker subsystem 601. For example: data indicative of a type or identifier, and a URL indicative of a location from which more detailed information is available. In the present embodiment the data packet includes the wireless speaker subsystem's MAC address.

Although the present embodiment is described by reference to the use of IP addresses, that should not be regarded as limiting. For example, in one embodiment layer two encapsulated packets are used, optionally in conjunction with a proprietary discovery protocol adapted to make use of such packets. In one such embodiment only MAC layer access is required, as opposed to higher layer access such as IP layer access.

Step 707 includes conducting a discovery search across network 606 for devices of interest—such as other wireless speaker subsystems or groups representative of wireless audio systems. The discovery search includes the provision of a probe frame, and in response to this probe frame a similar discovery message to that mentioned above is provided by each complementarily discoverable device on network 606 to wireless speaker subsystem 601. This includes wireless speaker subsystems 602 to 606.

It will be appreciated that, following this discovery process, each wireless speaker subsystem 601 to 605 discovers the other wireless speaker subsystems regardless of the order in which the wireless speaker subsystems connect to network 606. For instance, the first wireless speaker subsystem to connect discovers the other wireless speaker subsystems as they connect and advertise themselves. The last wireless speaker subsystem to connect discovers the other wireless speaker subsystems following a discovery search.

This completes sub-process 501. In the present embodiment each wireless speaker subsystem waits for a predetermined time before progressing to the arbitration sub-process 502. In one embodiment this predetermined time is ten seconds without discovery of a wireless speaker subsystem. That is, if a given wireless speaker subsystem is idle for ten seconds without discovering another wireless speaker subsystem, that wireless speaker subsystem progresses to the arbitration sub-process. In other embodiments alternate time periods are used. In some embodiments alternate rules determine when a wireless speaker subsystem progresses to the arbitration sub-process.

Figure 8:
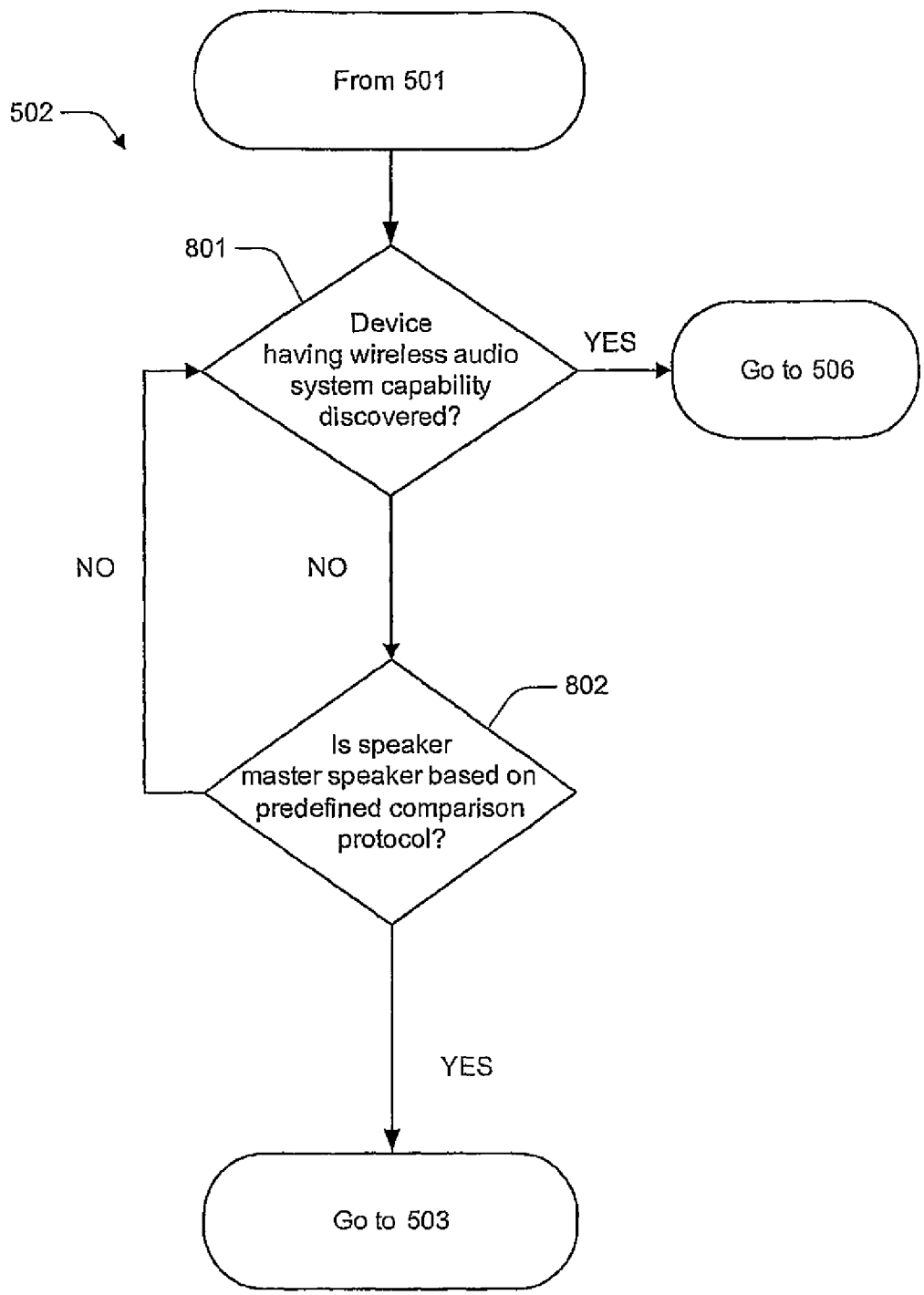
FIG. 8 shows a flowchart of an embodiment of a further method performed by a wireless speaker subsystem.

FIG. 8 shows the arbitration sub-process 502 of the present embodiment. Sub process 502 commences at decision 801 where wireless speaker subsystem 601 decides whether an existing device having a wireless audio system capability has been discovered. For example, whether an existing group 608 has been discovered. If one has been discovered, the method progresses to sub-process 506. Otherwise the method progresses to decision 802.

At decision 802 wireless speaker subsystem 601 determines whether it is the leader device. As foreshadowed, in this sub-process each wireless speaker subsystem inherently adopts a leader or member role. In the present embodiment, use is made of device MAC addresses, and as foreshadowed MAC addresses are shared during the discovery sub-process. The MAC address for each wireless speaker subsystem is embedded with a hierarchical identifier, such as the numerical value of the final bit in the address. In overview, the wireless speaker subsystems inherently self assign leader and member roles based on comparison protocol that takes into account a comparison of these identifiers. In some embodiments other factors are also used in addition. Given the relative nature of the present comparison protocol, in one implementation a particular wireless speaker subsystem might be leader whilst in another implementation that same wireless speaker subsystem might be a member.

The use of MAC addresses for leader/member assignment should not be regarded as limiting. In other embodiments alternate approaches or combinations of approaches are adopted. Some alternate approaches include, for example:

- Assessment of physical factors. For example, in a system having a first wireless speaker subsystem having an input for receiving a SPDIF signal and a second wireless speaker subsystem that does not accept SPDIF signal, the first wireless speaker subsystem can be inherently designed to act as a leader.
- The use of a unique hierarchy identifier as part of a discovery message. That is, a wireless speaker subsystem advertises itself in a manner indicative of a hierarchy identifier, and another wireless speaker subsystem recognizes that device as a relative leader or member based on a comparison of the discovered device's hierarchy identifier and its own hierarchy identifier. This is similar to the MAC address approach, but uses another number which may or may not be pre-existing for other networking purposes.
- A connection time based protocol where the time at which a wireless speaker subsystem associated to access point 607 determines whether it is the leader. For example, the leader is in one embodiment the first wireless speaker subsystem to associate to access point 607.

If, based on an assessment of the MAC addresses of discovered wireless speaker subsystems, wireless speaker subsystem 601 determines that it is the leader, the method progresses to sub-process 503. Otherwise the method loops to decision 801, and it will be appreciated that this repeats until a group 608 is found. In some embodiments a timeout function is implemented to contain such looping with predefined restraints.

In some embodiments the present arbitration is extended to determine whether a given device is a master or slave from a control interface perspective, with a master of that sort providing a web server for delivering a browser renderable control interface.

Figure 9:
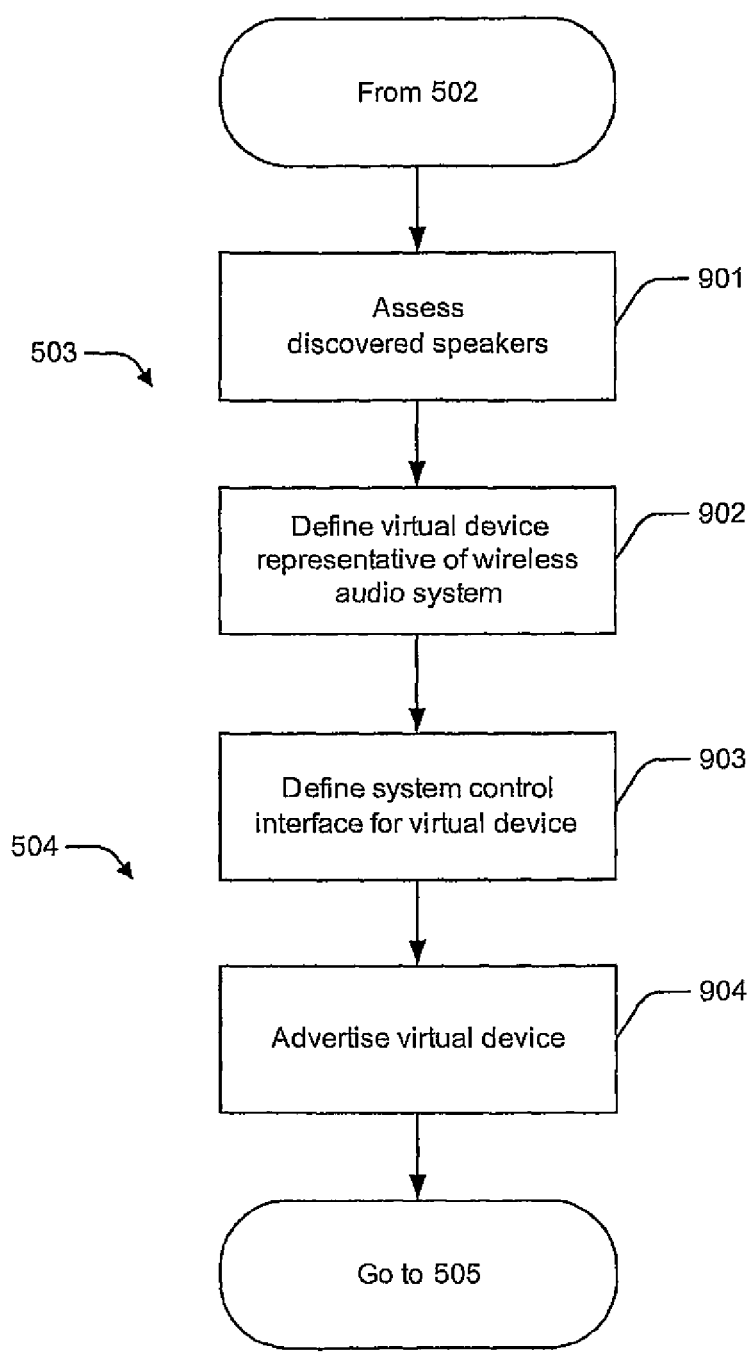
FIG. 9 shows a flowchart of an embodiment of a further method performed by a wireless speaker subsystem.

Sub-processes 503 and 504 of the present embodiment are shown in FIG. 9. As noted above, these sub-processes are only carried out by wireless speaker subsystem 601 where that wireless speaker subsystem determines it is the leader wireless speaker subsystem. At step 901 wireless speaker subsystem 601 assesses the wireless speaker subsystems that have been discovered—specifically wireless speaker subsystems 602 to 605—in terms of type and number. In some embodiments each wireless speaker subsystem is indicative of a location in a surround sound configuration, such as a "front-left" wireless speaker subsystem. In one embodiment each wireless speaker subsystem includes a physical or digital switch that is progressed between a plurality of positions to allow such identification. Based on the assessment at step 901, wireless speaker subsystem 601 defines group 608 at step 902. This definition step includes providing a discoverable description indicative of system 610, and assigning an IP address to device 608. For example, in the present embodiment the description might be of a "five wireless speaker subsystem wireless audio system". In embodiments where surround sound is enabled the description might be of a "five channel surround wireless audio system". This description is in some embodiments modified over time as a result of changes in hardware, such as the addition or removal of wireless speaker subsystems, or as a result of user interaction.

Sub-process 504 commences at step 903 with the definition of interface 609. This is in one embodiment performed based on instructions contained in the memory unit of wireless speaker subsystem 601. That is, wireless speaker subsystem 601 contains instructions indicative of how to define interface 609 based on the wireless speaker subsystems discovered. At step 904 interface 609 is provided, which includes making the interface available on network 606. In the present embodiment this in turn includes advertising device 608. As such, a user or other device on network 606 is able to discover device 608 and by way of interface 609 take control of system 610.

In the present embodiment group 608 is advertised in accordance with the UPnP open networking protocol. As part of this, device 608 provides some additional information itself. Specifically, group 608 provides in its discovery messages URLs to allow access to this additional information. The additional information for each device includes a UPnP description expressed in XML. This description includes a wide range of information, such as:

- The availability of a wireless audio system capability, along with the number of wireless speaker subsystems and so on.
- Details regarding how to take control of the wireless audio system capability. For example: command formats, how the system responds, parameters, variables rules and so on. Generally speaking, whatever information is required to allow a control unit to actually take meaningful control.
- A control URL for the system control interface. A system control signal is in some embodiments provided to the control URL to make an operational change to the wireless audio system.

In some cases information can be provided by URL link within the XML description, as opposed to being entirely contained within the description.

In the present embodiment interface 609 is accessible as a graphical user interface via a personal computer on network 606 through a web browser and/or a standalone program executable on a client terminal. A user of the personal computer is able to make complex changes to group 608 in this way—for example configuring surround sound, removing wireless speaker subsystems, setting up groups composed of one or more physical wireless speaker subsystems, zones composed of groups, which are in turn composed of physical wireless speaker subsystems, and so on.

Figure 10:
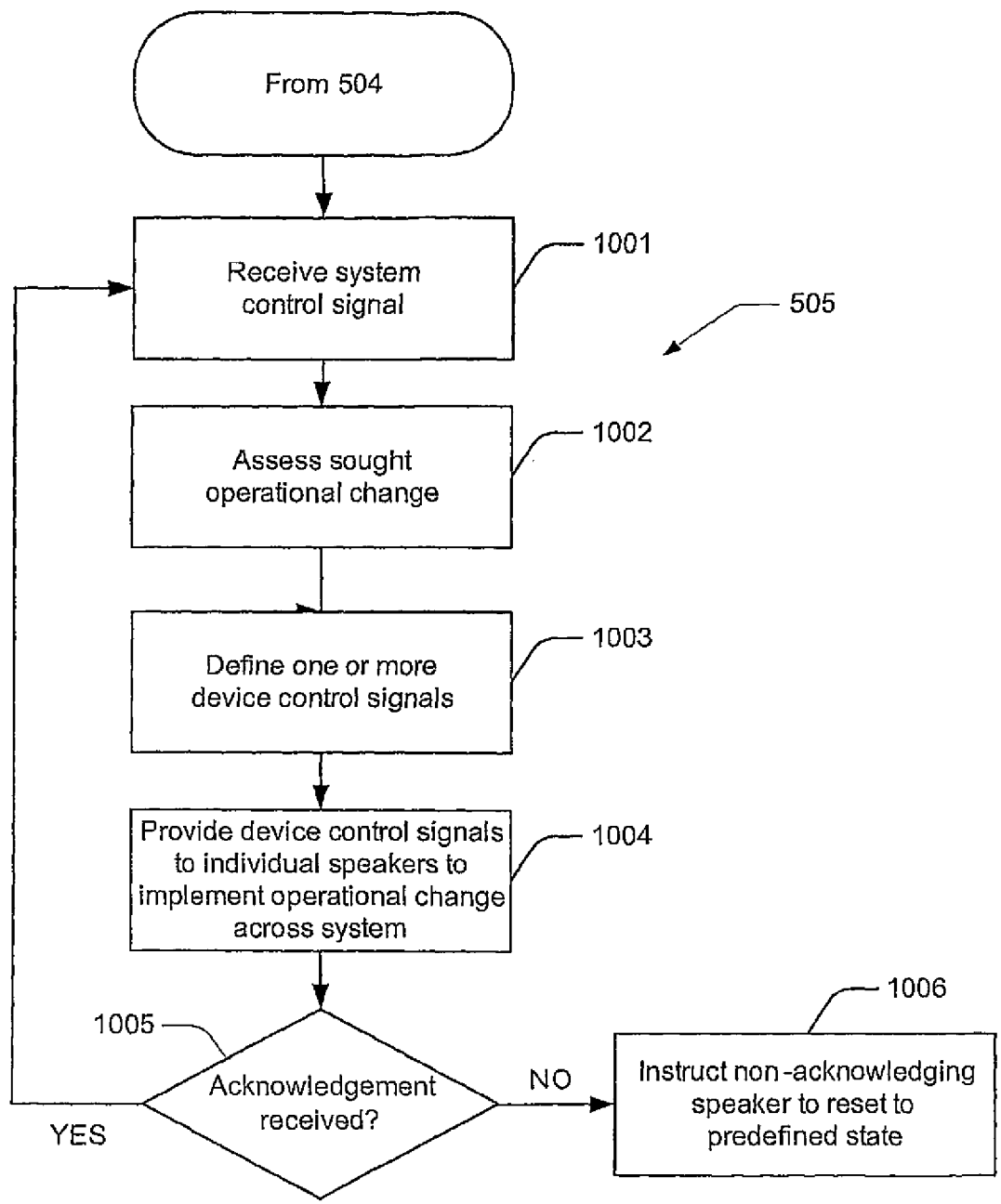
FIG. 10 shows a flowchart of an embodiment of a further method performed by a wireless speaker subsystem.

FIG. 10 illustrates sub-process 505 in greater detail, again in the context of wireless speaker subsystem 601. This assumes that wireless speaker subsystem 601 is the leader wireless speaker subsystem, and that sub-processes 503 and 504 have completed. Sub-process 505 commences at step 1001 with the receipt of a system control signal by system control interface 609. Interface 609 (in physical terms wireless speaker subsystem 601) is enabled to be responsive to the system control signals for assessing the sought operational change at step 1002 and defining one or more corresponding device control signals at 1003. In one embodiment the interface 609 receives commands in the same format each of wireless speaker subsystems 601 to 605 would individually receive control signals, and as such device control signals are the same as the system control signals. In other embodiments the system control signals are different to the device control signals.

Device control signals are provided by interface 609 to each of wireless speaker subsystems 601 to 606 to implement the operational change across those wireless speaker subsystems at step 1004. In the present embodiment this is performed using a custom network protocol based on a one way UDP broadcast message over IP from the leader wireless speaker subsystem (wireless speaker subsystem 601), coupled with a reliable TCP acknowledgement back to the leader from every other wireless speaker subsystem in system 610. This combination enables control signals to be received in a timely manner by all wireless speaker subsystems at a similar time, and also provides an asynchronous fail safe for wireless speaker subsystems that may not have received the message. At decision 1005 interface 609 determines whether acknowledgements have been received from each wireless speaker subsystem within a predetermined time period. If all acknowledgements are received, the method progresses to step 1001. Otherwise, if a wireless speaker subsystem fails to acknowledge a control message within a given time, interface 609 will, via a TCP message, instruct the failing wireless speaker subsystem to reset itself to a predefined state and progress to sub-process 506. This message is provided at step 1006.

In another embodiment device control signals are unicast to the individual wireless speaker subsystems, as opposed to using a one way UDP broadcast message. This alternate approach better provides for individual control of the wireless speaker subsystems.

In some embodiments a device control signal includes data indicative of an execution time. For example, a device control signal is indicative of "apply operational change X at time Y". This allows for synchronisation of command execution such that, in the example of volume control, the wireless speaker subsystems each alter their volume at the same time. It will be appreciated that achieving such synchronisation in some embodiments requires for synchronisation of internal clocks in the individual wireless speaker subsystems. In one embodiment such synchronisation of internal clocks is carried out for the related purpose of ensuring synchronised media playback. In some embodiments the execution time is expressed as an offset of a known time.

Figure 11:
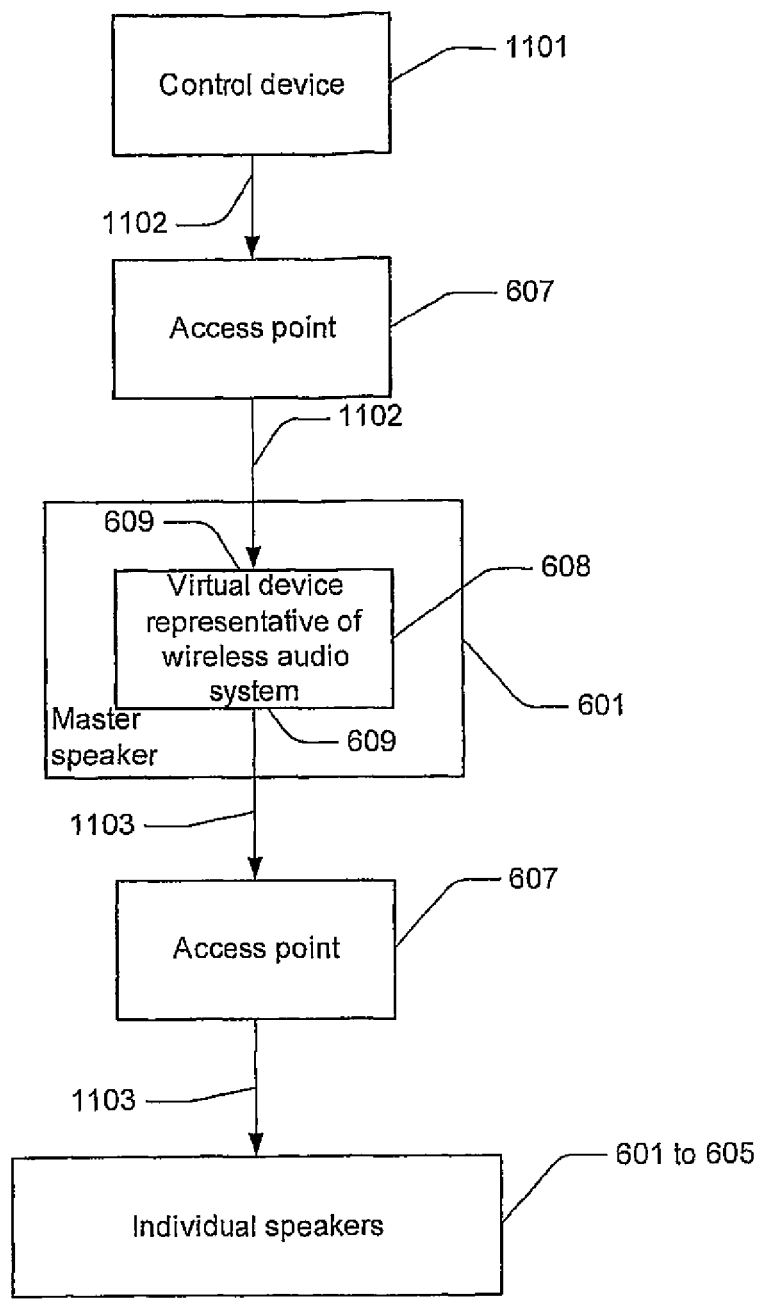
FIG. 11 schematically illustrates data flow in a wireless audio system according to one or more aspects of the present invention.

FIG. 11 schematically illustrates data flow during sub process 505, and the numerical conventions of FIG. 6 are adopted. In overview, a control device 1101 provides a system control signal 1102, and subsequently corresponding device control signals 1103 are received by wireless speaker subsystems 601 to 605.

It will be appreciated that the above approach involves some redundancy in the sense that interface 609 provides signals to wireless speaker subsystem 601 over network 606 irrespective of the fact that interface 609 is provided by wireless speaker subsystem 601. This redundancy balances with simplicity. In other embodiments wireless speaker subsystem 601 implements the operational change without the need for a device control signal to be sent from device 608 to wireless speaker subsystem 601.

There are two general categories of operational changes that affect system 610. The first of these is a global change that affects every wireless speaker subsystem in the same way. For example: a global increase in volume. In such a case the system control signal is the same as the device control signals, and effectively wireless speaker subsystem 601 is simply responsible for distributing the system control signal as a device control signal to each of the wireless speaker subsystems. The second category is a complex change that affects different wireless speaker subsystems in a different way. For example: where system 610 has been configured to provide a five-channel surround sound configuration, and the operational change affects only a selection of the wireless speaker subsystems. In one example a system control signal is provided to reduce the volume on the front left wireless speaker subsystem, which in this embodiment is wireless speaker subsystem 602. In such a case wireless speaker subsystem 601 is responsible for assessing the system control signal, and defining device specific device control signals. In the present example a single device control signal is defined, this signal being uniquely intended for and provided to wireless speaker subsystem 602, instructing wireless speaker subsystem 602 to reduce its output volume.

It will be appreciated that configuring wireless speaker subsystems 601 to 606 to adopt roles in a complex configuration may involve additional steps and manual intervention. For example, if a 5-channel surround system is desired, it is necessary to identify which wireless speaker subsystem is physically located in which position. Device 608 in some embodiments provides a user interface accessible via a personal computer to assist in such a task.

It is worth noting that the ability of wireless speaker subsystem 601 to control wireless speaker subsystems 602 to 606 hinges on wireless speaker subsystem 601 being privy to information detailing the manner in which those wireless speaker subsystems are controlled. This information is in some embodiments maintained by wireless speaker subsystem 601, or in other embodiments obtained during the discovery sub-process, or in other embodiments even obtained from a remote data source such as the Internet when required. Assuming such information can be obtained, wireless speaker subsystem 601 is able to provide a wireless audio system including wireless speaker subsystems from alternate manufactures. For example, wireless speaker subsystem 601 is able to include substantially any UPnP wireless speaker subsystem in a wireless audio system.

Effectively, wireless speaker subsystem 601 provides by way of device 608 and interface 609 a centralized location for receiving system control signals that effect system 610 as a whole. For example, if there is a desire to increase the volume on all of wireless speaker subsystems 601 to 605, a signal indicative of that operational change is provided to device 608. This circumvents the need for a user to manually provide a signal to each individual wireless speaker subsystem.

In some embodiments device 608 is responsive to the discovery of other controllable devices on network 606 for selectively defining additional groups. For example, a particular wireless speaker subsystem may provide a microphone input, allowing a virtual hands-free telephone device to be created. Group logic maintained on wireless speaker subsystem 501 is able to interrogate devices on the network, determine their capabilities and present a list of possible groups to create given the resources available.

Figure 12:
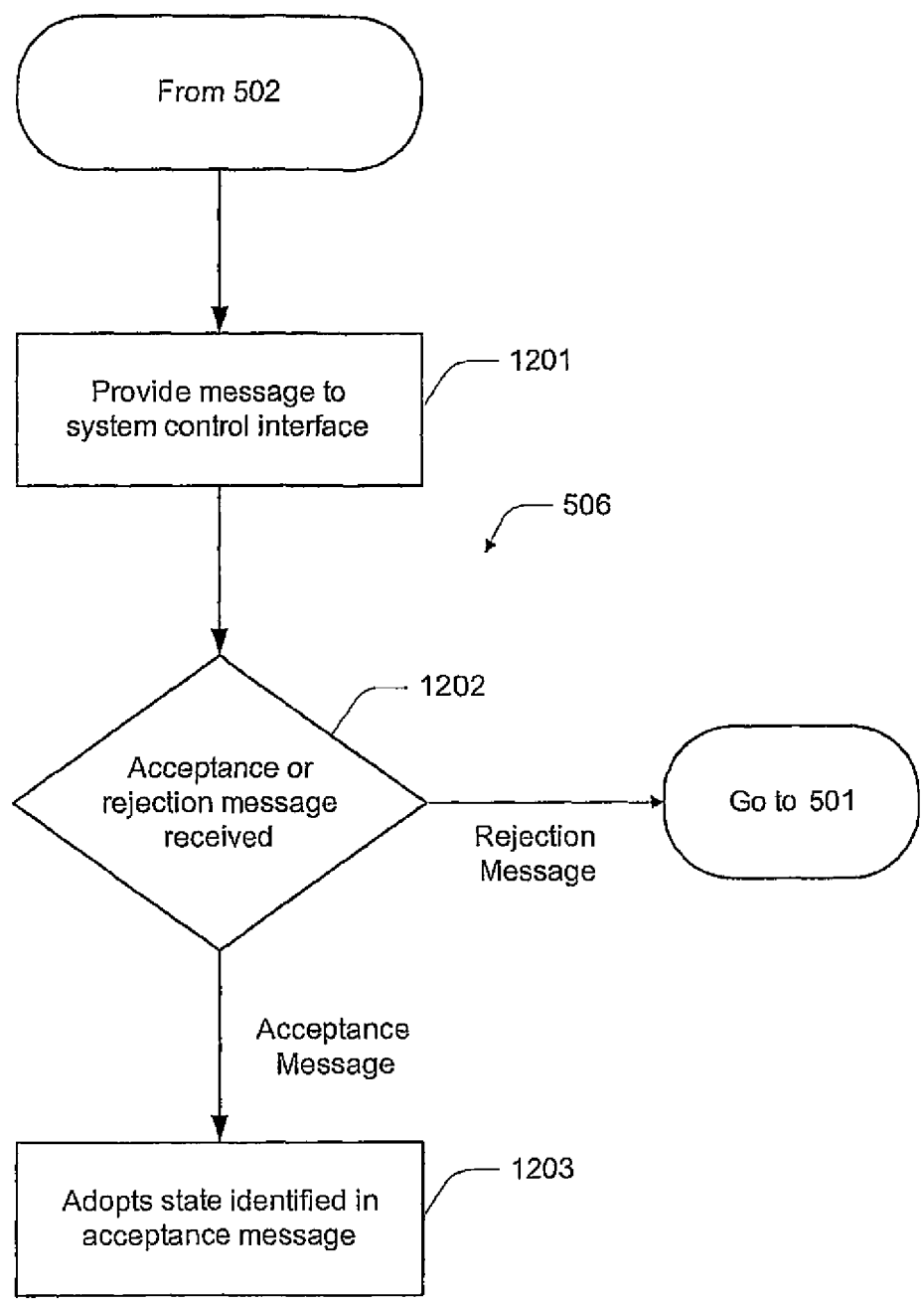
FIG. 12 shows a flowchart of an embodiment of a further method performed by a wireless speaker subsystem.

FIG. 12 illustrates sub process 506 in greater detail. Given that the above disclosure describes sub-processes 503 to 505 in terms of wireless speaker subsystem 601, this sub process is described by reference to wireless speaker subsystem 602—which determines during sub-process 502 that it is not the leader. At step 1201 wireless speaker subsystem 602 provides a message to interface 609 indicative of its willingness to participate in system 610. Interface 609 is responsive to such as message for providing an acceptance or rejection, and this is received at decision 1202. In one instance, in the case of rejection, wireless speaker subsystem 602 may return to sub-process 501 to ensure a consistent system state. In the case of acceptance, the acceptance message is indicative of an operational state provided by device 608 that should be adopted by wireless speaker subsystem 602. The rationale is for device 608 to know the state of each wireless speaker subsystem in system 610. In some embodiments device 608 periodically interrogates each wireless speaker subsystem to obtain data indicative of their respective operative states. At step 1203 wireless speaker subsystem 602 adopts the state identified by the acceptance message, and provides a TCP acknowledgement to device 608.

In some embodiments a group which references other groups may be created. A set of groups may be referred to as a zone while a set of physical devices could be referred to as a group. A zone would be created to address the need for multi-room media playback where multiple groups would be required to act on identical media and commonly process commands relating to media playback. A group composed of groups would address the same issues of command and media stream routing between groups as would be required in an embodiment where a group routs commands to physical devices.

Figure 13:
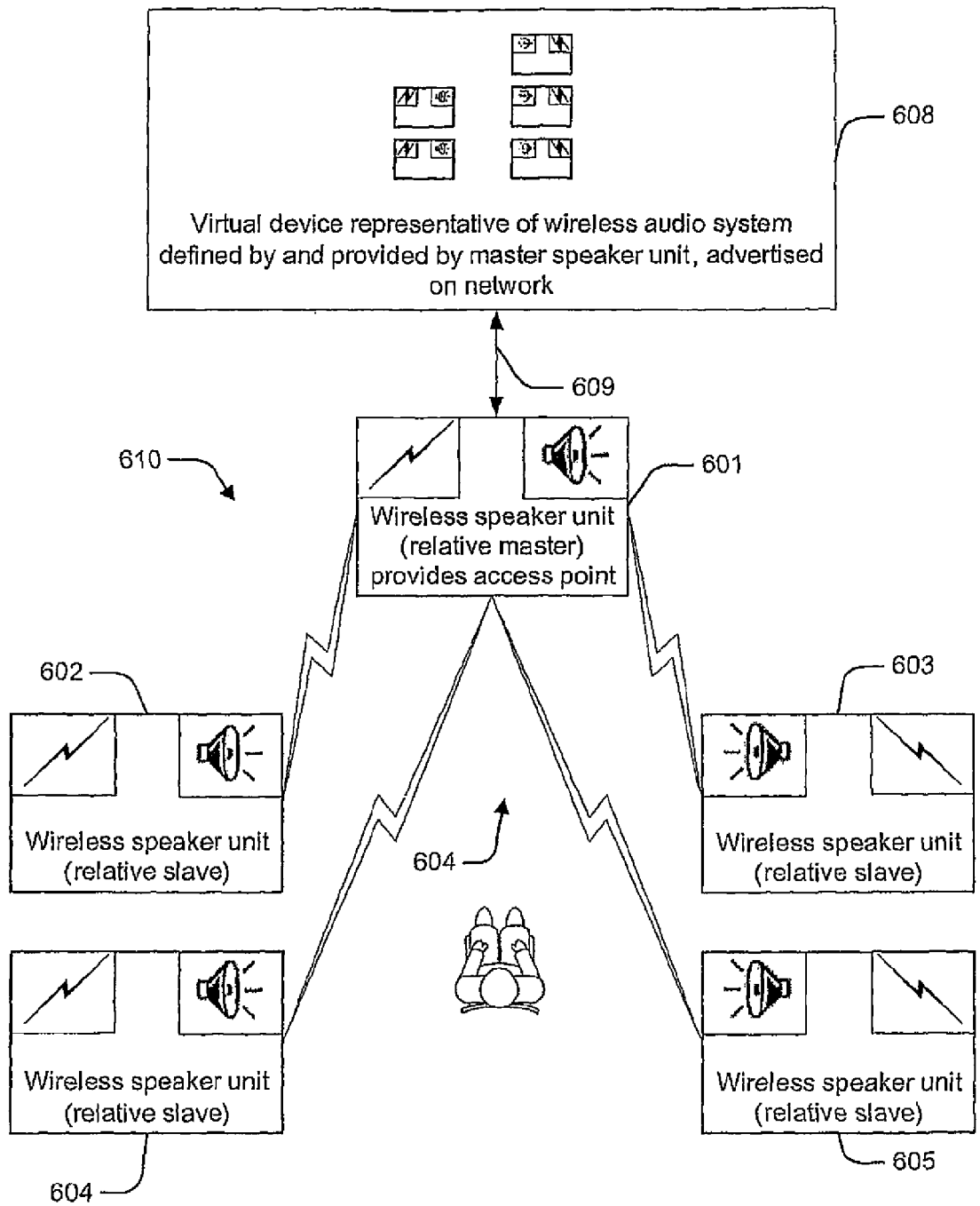
FIG. 13 schematically illustrates a wireless audio system embodiment including a plurality of wireless speaker subsystems.

As noted above, in the embodiment of FIG. 6 wireless speaker subsystems 601 to 605 associate to an existing access point 607. In some instances no access point is provided, and one of the wireless speaker subsystems inherently provides an access point. Such an embodiment is shown in FIG. 13, which adopts the same numbering conventions as FIG. 6. In this embodiment each wireless speaker subsystem scans for an available access point for a predetermined period of time, and if no beacon or probe response frames are received, establishes itself as an open access point. In a similar manner to the leader/member (master/slave) determination technique discussed above, MAC addresses are often used to assist this process. Specifically, in one embodiment, each wireless speaker subsystem scans for a period of time related to the final byte in its MAC address—in some embodiments between about five to ten seconds multiplied by the value of that final byte. If no access point is found within that time, the wireless speaker subsystem initiates its own open access point. It will be appreciated that by such an approach only one of the wireless speaker subsystems need initiate an access point, and the remaining wireless speaker subsystems will associate to that access point. In one embodiment the wireless speaker subsystem providing the access point becomes the leader device, reducing the complexity of sub-process 502.

In some embodiments the wireless speaker subsystems first associate to an open access point, and subsequently self arrange themselves into an internal private network.

Figure 14:
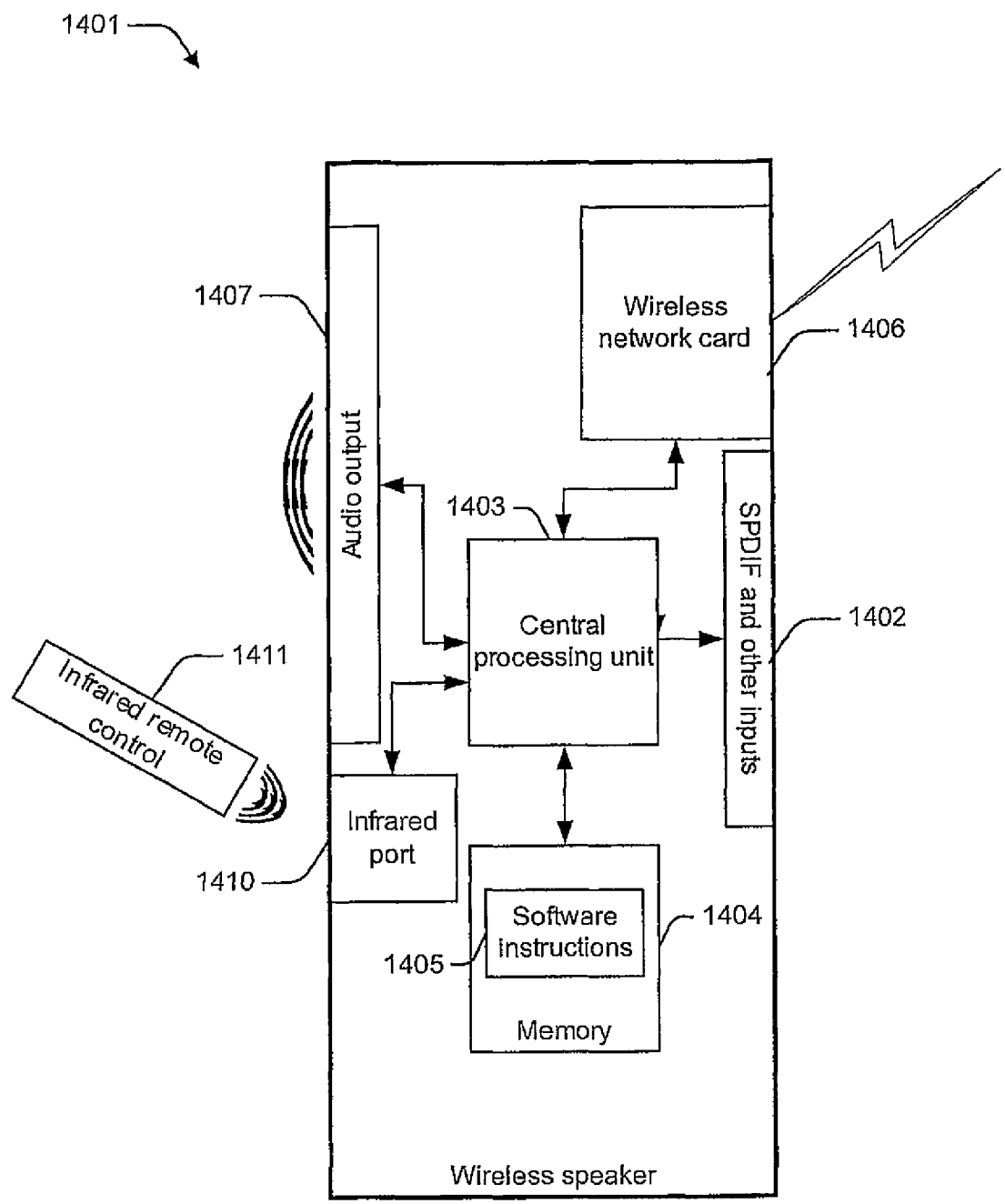
FIG. 14 schematically illustrates an embodiment of a wireless speaker subsystem.

FIG. 14 shows a wireless speaker subsystem 1401 in more detail. This wireless speaker subsystem is appropriate for use in the above embodiments. For example, in some embodiments wireless speaker subsystem 601 is interchangeable with wireless speaker subsystem 1401.

Wireless speaker subsystem 1401 includes an input array 1402 for receiving audio signals. Array 1402 includes a SPDIF input, along with various other standard and proprietary digital audio inputs. In some instances array 1402 includes one or more analogue audio inputs, in which case wireless speaker subsystem 1401 includes an analogue to digital converter for converting analogue audio signals into digital form. Once received (and where necessary digitized) the audio signals are processed by a processing unit, e.g., a central processing unit (CPU) 1403, which operates in conjunction with memory 1404. Memory 1404 includes software instructions 1405 which, among other functions, allow wireless speaker subsystem 1401 to perform methods described herein. It is noted that not all instructions required for performing these methods need be in memory 1404 at a given time.

Wireless speaker subsystem 1401, given that it presents the virtual interface for system 610, also becomes responsible for fetching media from a server, or in the case of an SPDIF stream, partially recovering that stream from a digital input. Data indicative of this media or stream is then distributed to the other devices in the group. CPU 1403 is responsible for administering playback of a received audio signal. In a broad sense, this includes two distinct tasks. Firstly, using a wireless network interface 1406, providing instructions to other wireless speaker subsystems to play respective components of the audio signal. Secondly, using an audio output 1407 (which in some embodiments includes one or more speaker cones), playing back the intended center wireless speaker subsystem component of the audio signal. There are, of course, detailed issues of rendering and synchronization, and these fall beyond the scope of the present disclosure.

Wireless speaker subsystem 1401 also includes an infrared port 1410. This infrared port receives infrared control signals from a compatible infrared remote controller 1411. Where wireless speaker subsystem 1401 acts as an individual wireless speaker subsystem, such a signal is a device control signal. However, when wireless speaker subsystem 1401 is part of a wireless audio system, such a signal is recognized as a system control signal. A system control signal received by infrared port 1410 is provided by a TCP message to the group. This is discussed further in by reference to FIG. 15 and FIG. 16.

In other embodiments alternate remote controls are used, such as Bluetooth remotes, 802.11 type networked remotes, and radio frequency remotes.

In other embodiments a control signal received by infrared port 1410 is provided to the group by means other than TCP message—for example by a layer two encapsulated message or other proprietary message.

Figure 15:
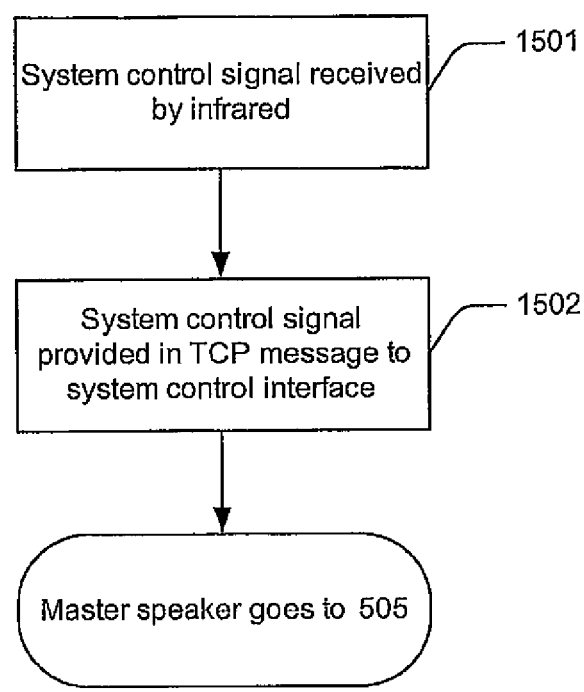
FIG. 15 shows a flowchart of an embodiment of a further method performed by a wireless speaker subsystem.

FIG. 15 shows a method for processing a system control signal received by infrared. This method is described by reference to the example of FIG. 6. The signal is received at step 1501, and provided in a TCP message to interface 609 of device 608 at step 1502. Device 608 then progresses to sub-process 505, and the relevant operational change is implemented across the system.

In overview, there are multiple one-way external interfaces that must propagate received commands to group 608. Because this is a unidirectional message, it is accomplished using a TCP connection from the wireless speaker subsystem receiving the infrared signal back to the group. Upon being received at the group, the received commands are aggregated to remove duplicate commands. Duplicates can occur because the same infrared command might be received concurrently at more than one infrared port. Obviously, though, only one action is desirable per button press on remote 1411. After aggregation then, the resulting single change in state is then distributed to all of the wireless speaker subsystems as discussed in relation to sub process 505.

In one embodiment, messages provided at step 1502 are timestamped. In that embodiment, aggregating the received commands to remove duplicate commands includes analysis of these timestamps. In particular, when a command is received via infrared at step 1501, a timestamp is defined to identify the time at which the infrared command was received. The group, upon receipt of timestamped messages, compare the timestamps to determine whether received commands are unique or duplicates. In one embodiment the timestamp is a global timestamp derived from a global clock. In another embodiment the timestamp is derived from a device clock maintained by a particular wireless speaker subsystem, and all device clocks in the system are synchronised in accordance with a synchronisation protocol.

By this approach, a user can, by way of remote 1411, control system 610 by physically pointing the remote substantially in the direction of any of the wireless speaker subsystems and pressing one or more buttons enabled to cause operational changes.

Figure 16:
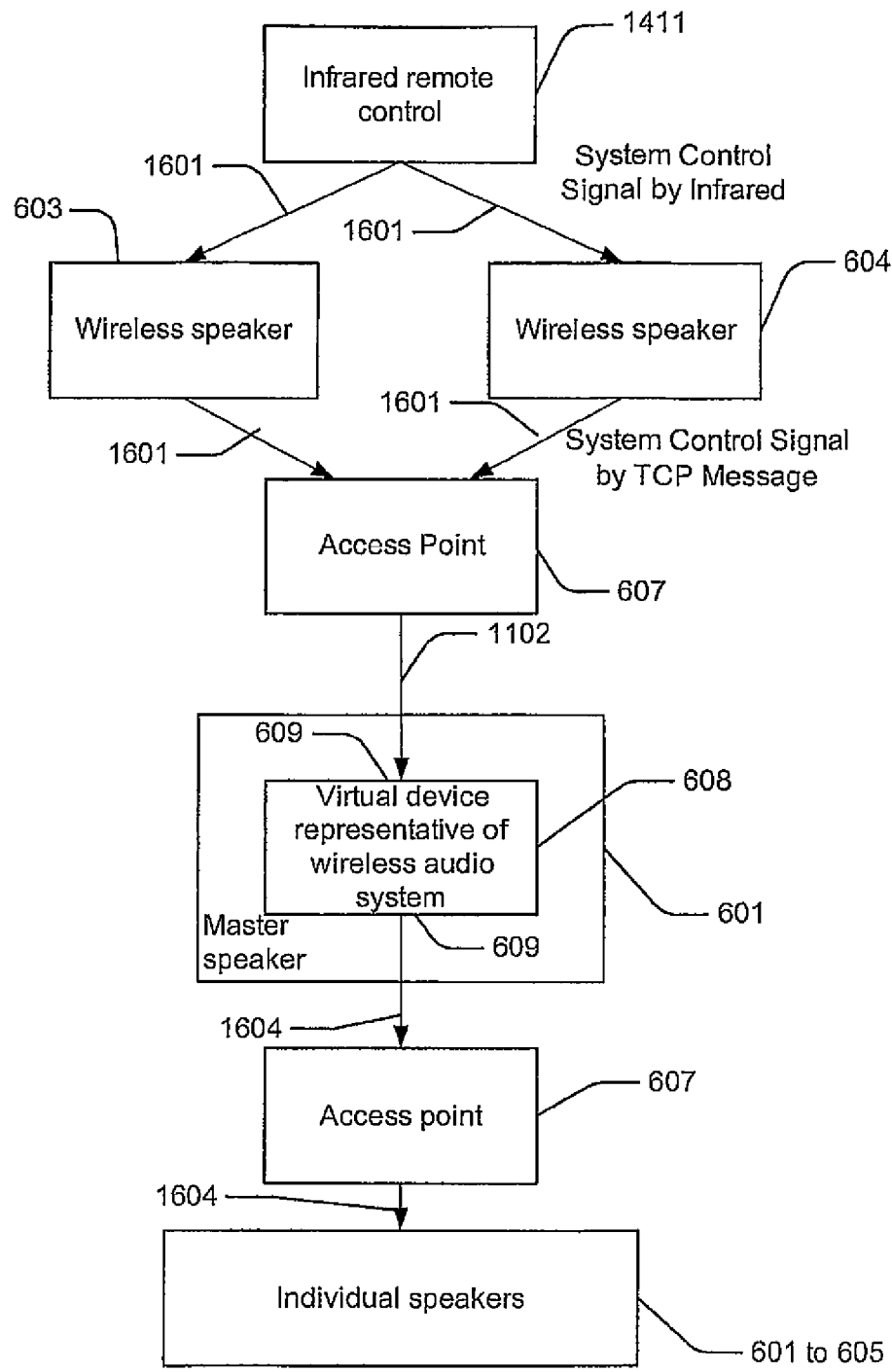
FIG. 16 schematically illustrates data flow in a wireless audio system embodiment.

FIG. 16 shows the data paths for infrared signals in a manner similar to the example of FIG. 11. In overview, remote 1411 provides a system control signal 1601, and this signal is received by to wireless speaker subsystems 603 and 604. These wireless speaker subsystems provide identical system control signals 1602 to device 608, and wireless speaker subsystems 601 to 605 subsequently receive corresponding device control signals 1604.

Similar infrared approaches are in some embodiments applied in situations where a group is not used. For example, where the leader wireless speaker subsystem advertises itself as a leader wireless speaker subsystem. In that case data indicative of the infrared signal is provided using a TCP connection from the wireless speaker subsystem receiving the infrared signal back to the leader wireless speaker subsystem.

Figure 17:
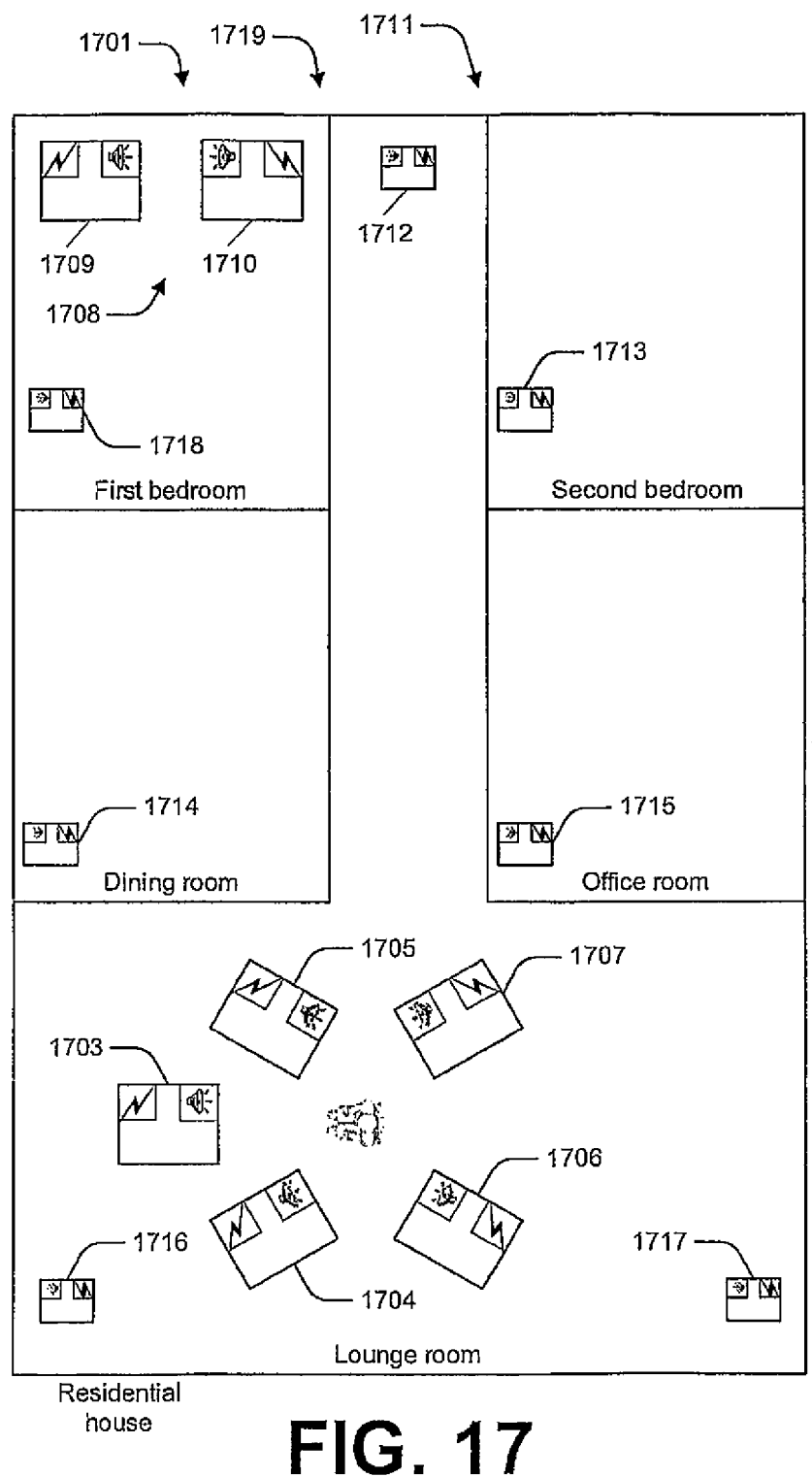
FIG. 17 is a plan view of a location having a plurality of wireless audio system embodiments.

In some embodiments multiple wireless audio systems are defined on a common network. For example, a building is split into areas where a different wireless audio system serves each area, although a single network serves all of the areas in combination. This is shown in the example of FIG. 17, which provides a plan view of a residential house 1701. There are three wireless audio systems defined:

Lounge DVD surround system 1702, including wireless speaker subsystems 1703 to 1707.
Bedroom stereo system 1708, including wireless speaker subsystems 1709 and 1710.
House ambiance system 1711, including wireless speaker subsystems 1712 to 1718.
House leader system 1719, including all of the above wireless speaker subsystems.

Where multiple systems exist on a common network, the groups representative of these systems determine which is to become the parent system (also referred to as the zone leader). This is largely dependent on the situation and the circumstances in which the systems were created. In some embodiments, one system is explicitly added to an existing system as a child system. In this ease, system 1712 is the parent system and a group representing this system presents a system control interface for controlling all wireless speaker subsystems in the zone. This interface is used to apply an operational change across the whole zone—for example simultaneously muting all wireless speaker subsystems in the house. Each child system (systems 1702, 1708 and 1711) is represented by a respective group having its own control interface. To apply an operational change in a child system, a system control signal is provided to the group representative of that child system. To apply an operational change to the parent system, a system control signal is provided to the group representative of the parent system. In some embodiments the zones representative of all parent and child systems are provided by a common leader wireless speaker subsystem, regardless of whether that wireless speaker subsystem is included in each and every child system.

Although embodiments are described herein by reference to wireless speaker subsystems, it will be appreciated that in other embodiments other wireless media renderers are used. For example, wireless video units that receive over a wireless network data indicative of video and provide that video via a video output such as an LCD screen or an analogue or digital connection port.

Additionally, although the above embodiments have been described by reference to wireless networking, in some embodiments alternate networking arrangements are used such as wire-based Ethernet networks and power line networks. It will be appreciated that embodiments of the invention described by reference to wireless networking are equally applicable to these other networking arrangements.

It should be appreciated that although the invention has been described in the context of the IEEE 802.11 standard, the invention is not limited to such contexts and may be utilized in various other applications and systems, for example in other systems that use OFDM. OFDM is one example of a multicarrier system in which the signal for transmission is split into a set of subcarriers. The invention may also be applicable to other wireless receivers that use multicarriers.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

While an embodiment has been described for operation in an OFDM receiver with RF frequencies in the 5 GHz range and 2.4 GHz range (the 802.11a and 802.11g variants of the IEEE 802.11 standard), the invention may be embodied in receivers and transceivers operating in other RF frequency ranges. Furthermore, while a transceiver embodiment for operation conforming to the IEEE 802.11 OFDM standards has been described, the invention may be embodied in transceivers conforming to other standards and for other applications, including, for example other WLAN standards and other wireless standards. Applications that can be accommodated include IEEE 802.11a COFDM wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable medium encoded with computer-executable code.

Furthermore, a computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium encoded with a set of instructions, e.g., a computer program that are for execution on one or more processors, e.g., one or more processors that are part of a wireless speaker device or other wireless media rendering device. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of computer-readable medium (e.g., a computer program product on a computer-readable storage medium) encoded with computer-readable program code embodied in the medium.

The software may further be transmitted or received over a network via a network interface device. While the computer-readable medium is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by one or more of the processors and that cause the one or more processors to perform any one or more of the methodologies of the present invention. A computer-readable medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may take the form of acoustic or light waves, such as those generated during radio wave and infrared data communications. For example, the term "computer-readable medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other mariner.

"Variants of the IEEE 802.11 standard" as used herein means the variants and proposed variants of the IEEE 802.11 standard. Variants are versions defined in clauses of the standard and proposed amendments of the standard.

It should be appreciated that although the invention has been described in the context of variants of the IEEE 802.11 standard, the invention is not limited to such contexts and may be utilized in various wireless and non-wireless network applications and systems.

In one embodiment the SPDIF enabled device becomes the leader. In some embodiments, the group and the media source will not be implicitly linked together, so it may be possible for one device to have the SPDIF input and another to provide the streaming source from SPDIF.

A networked digital media device may be connected through any form of computer network including networks with wired and wireless physical layers and networks consisting of multiple physical layers. The network through which the digital media device is connected does not affect the operation of the group other than to partially vary the extent to which synchronous playback is possible.

While in most of the description above, a set of wireless speakers is used as an example of a networked digital media player, the invention is not limited to wireless speakers. Those in the art would readily be able to modify the description provided herein for wireless speakers and apply the methods and apparatuses to other discrete media devices. Thus while in one embodiments, some of the media devices include a radio interface and the network includes a wireless network, in general, the invention is applicable to media devices that can connect to a computer network. The description is provided in terms of wireless speakers in order to keep the description simple and not obscure the inventive concepts.

Furthermore, in most of the description above, a wireless audio system is used as an example of a networked digital media playback system—i.e., as an example of a system that allows one or more devices connected via a computer network to render digital media, the invention is not limited to a wireless audio system. Those of ordinary skill in the art would readily be able to modify the description provided for wireless audio systems herein and apply the methods and apparatuses to other digital media playback systems. The description is provided in terms of wireless speakers and a wireless audio system in order to keep the description simple and not obscure the inventive concepts.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method, in a networked media playback device, for allowing a wireless web enabled device to provide media playback control signals for the networked media playback device or a networked media playback system, the method including the steps of:
   (i) providing, via software instructions maintained by the networked media playback device, a local web server that is configured to deliver data indicative of a browser-renderable control interface for the networked media playback device or networked media playback system, wherein the browser-renderable control interface is renderable as a graphical user interface that provides objects for selection of media for playback and control of media playback via the networked media playback device or networked media playback system;
   (ii) being responsive to a predetermined request from the wireless web enabled device for delivering, to the wireless web enabled device, browser renderable code defining the graphical user interface that provides objects for selection of media for playback and control of media playback via the networked media playback device or networked media playback system, thereby to enable loading of the browser renderable code by a web browser application of the wireless web enabled device, such that the loading of the browser renderable code renders the graphical user interface as a web page displayed by the web browser application;
   (iii) being responsive to utilisation of the control interface as rendered in the web browser application for defining one or more playback control commands; and
   (iv) implementing the one or more playback control commands in the networked media playback device or networked media playback system.

2. A method according to claim 1 wherein step (ii) includes:
   (iia) receiving data indicative of a browser navigation request from the wireless web enabled device, the browser navigation request being indicative of a predetermined URI; and
   (iib) being responsive to the browser navigation for resolving the URI to the local web server such that the data indicative of the control interface is delivered in response to the browser navigation request.

3. A method according to claim 2 wherein the networked media playback device provides a local domain name server for allowing resolution of the predetermined URI.

4. A method according to claim 1 wherein the predetermined request includes data indicative of an IP address supplied by a remote server, wherein the remote server correlates user data for the networked media playback device with an IP address for the networked media playback device.

5. A method according to claim 1 wherein the networked media playback device or networked media playback system is controllable in accordance with the UPnP protocol.

6. A method according to claim 1 wherein the wireless web enabled device includes a memory unit that maintains one or more media files, and the one or more playback commands includes an instruction to render a selected one or more of the media files via the networked media playback device or networked media playback system.

7. A method according to claim 1 including the steps of:
  connecting to a wireless network;
  identifying one or more other networked media playback devices on the network;
  determining whether or not to provide the local web server based on analysis of the one or more other networked media playback devices on the network, such that only a single control interface is provided on the network.

8. A method according to claim 1 wherein the control interface is for a networked media playback system having a master networked media playback device, and the step of implementing the one or more playback control commands includes providing the one or more playback control commands to the master networked media playback device.

9. A non-transitive computer-readable medium encoded with a set of instructions that when executed by one or more processors cause the one or more processors to carry out a method according to claim 1.

10. A media playback unit including:
  a networking interface for connecting to a computer network;
  a memory module that maintains data indicative of a browser renderable playback control interface, wherein the browser-renderable control interface is renderable as a graphical user interface that provides objects for selection of media for playback and control of media playback via the networked media playback device or networked media playback system; and
  a processor that is configured to provide a web server, and thereby configured to deliver the data indicative of the browser renderable playback control interface to a wireless web enabled device, thereby to allow the device to control the media playback unit and/or a media playback system including the media playback unit,
  wherein the data delivered to the wireless web enabled device includes browser renderable code defining the graphical user interface that provides objects for selection of media for playback and control of media playback via the networked media playback device or networked media playback system, thereby to enable loading of the browser renderable code by a web browser application of the wireless web enabled device, such that the loading of the browser renderable code renders the graphical user interface as a web page displayed by the web browser application.

11. The multimedia playback unit as recited in claim 10, wherein the networking interface includes a radio interface and wherein the computer network is a wireless network.

* * * * *